United States Patent
Irie et al.

(10) Patent No.: US 8,918,269 B2
(45) Date of Patent: Dec. 23, 2014

(54) CONTROL APPARATUS FOR INTERNAL COMBUSTION ENGINE

(71) Applicant: Honda Motor Co., Ltd., Tokyo (JP)

(72) Inventors: Seiichiro Irie, Wako (JP); Hisashi Ito, Wako (JP); Hideharu Takamiya, Wako (JP); Hirotaka Komatsu, Wako (JP); Yasuhiro Motohashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/364,500

(22) PCT Filed: Oct. 19, 2012

(86) PCT No.: PCT/JP2012/077074
§ 371 (c)(1),
(2), (4) Date: Jun. 11, 2014

(87) PCT Pub. No.: WO2013/108455
PCT Pub. Date: Jul. 25, 2013

(65) Prior Publication Data
US 2014/0338636 A1 Nov. 20, 2014

(30) Foreign Application Priority Data

Jan. 19, 2012 (JP) ................................ 2012-008563

(51) Int. Cl.
*F02D 37/02* (2006.01)
*F02P 5/152* (2006.01)
*F02M 25/08* (2006.01)

(52) U.S. Cl.
CPC ..................................... *F02M 25/08* (2013.01)
USPC . 701/108; 701/109; 123/406.44; 123/406.45; 123/406.46

(58) Field of Classification Search
USPC ................ 701/108, 109; 123/406.26, 406.44, 123/406.45, 406.48, 516, 518–520
See application file for complete search history.

(56) References Cited

U.S. PATENT DOCUMENTS

| | | | | |
|---|---|---|---|---|
| 4,748,959 | A | * | 6/1988 | Cook et al. ............... 123/406.45 |
| 6,516,772 | B2 | * | 2/2003 | Ueno et al. ..................... 123/295 |
| 2003/0226544 | A1 | * | 12/2003 | Nakamori et al. ........ 123/406.48 |

FOREIGN PATENT DOCUMENTS

| | | | |
|---|---|---|---|
| JP | 2002-147279 | A | 5/2002 |
| JP | 2005-325762 | A | 11/2005 |
| JP | 2006-258029 | A | 9/2006 |
| JP | 2006-328963 | A | 12/2006 |
| JP | 2007-297955 | A | 11/2007 |
| JP | 2009-024671 | A | 2/2009 |
| WO | WO 2011/074302 | A1 | 6/2011 |

OTHER PUBLICATIONS

Written Opinion of the International Search Authority dated Nov. 27, 2012 corresponding to International Patent Application No. PCT/JP2012/077074 and English translation thereof.
International Search Report dated Nov. 27, 2012 corresponding to International Patent Application No. PCT/JP2012/077074 and English translation thereof.

* cited by examiner

*Primary Examiner* — Erick Solis
(74) *Attorney, Agent, or Firm* — Squire Patton Boggs (US) LLP

(57) ABSTRACT

A control apparatus for an internal combustion engine having a throttle valve disposed in an intake passage of the engine is provided. A wide-open intake air amount, which is an intake air amount corresponding to a state where the throttle valve is fully opened, is calculated, and a theoretical intake air amount, which is an intake air amount corresponding to a state where no exhaust gas of the engine is recirculated to a combustion chamber of the engine, is calculated according to the wide-open intake air amount and the intake pressure. An air-fuel ratio correction amount and a learning value thereof are calculated according to the detected air-fuel ratio, and a reference intake air amount is calculated using the intake pressure, the engine rotational speed, the air-fuel ratio correction amount, and the learning value. A lower limit value of the detected intake air amount is set according to the reference intake air amount, and a limit process is performed for limiting the detected intake air amount within a range of values which are equal to or greater than the lower limit value. An amount of the evaporative fuel/air mixture supplied to the intake passage is calculated, and the limit-processed intake air amount is corrected using the evaporative fuel/air mixture amount to calculate an intake gas amount. An exhaust gas recirculation ratio is calculated using the theoretical intake air amount and the intake gas amount.

10 Claims, 17 Drawing Sheets

FIG. 7
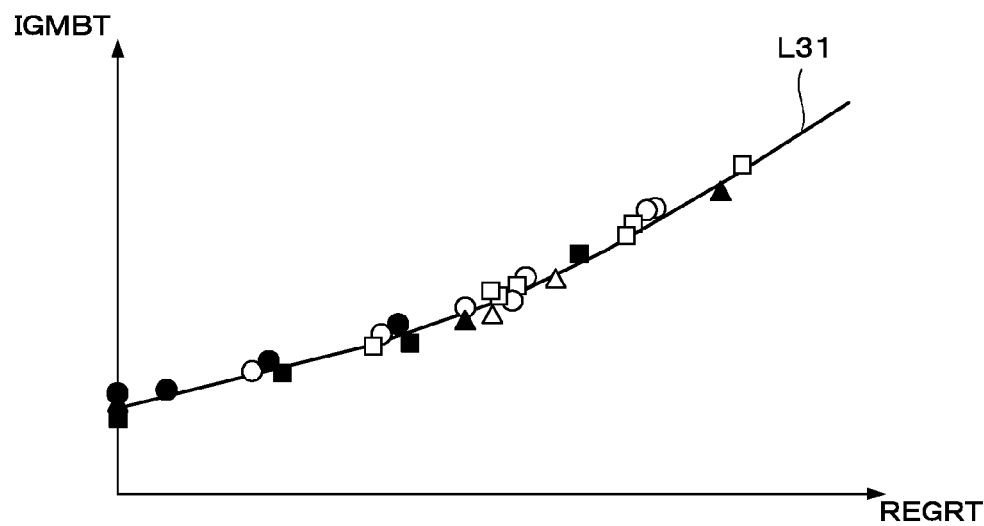
FIG. 8
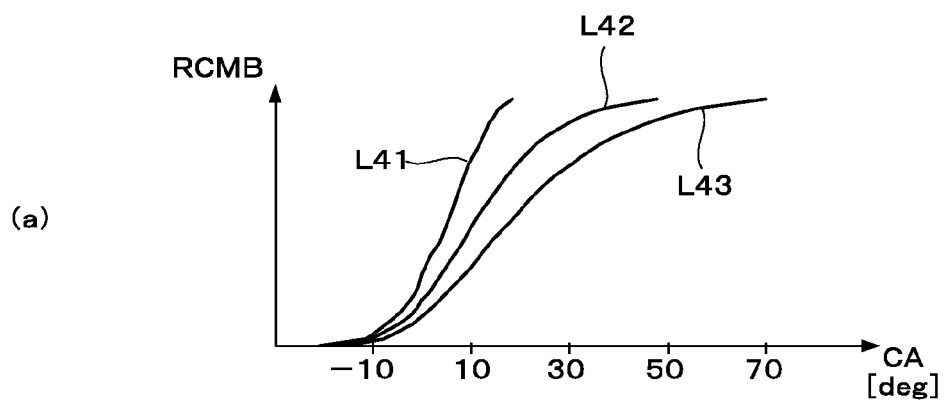
(a)
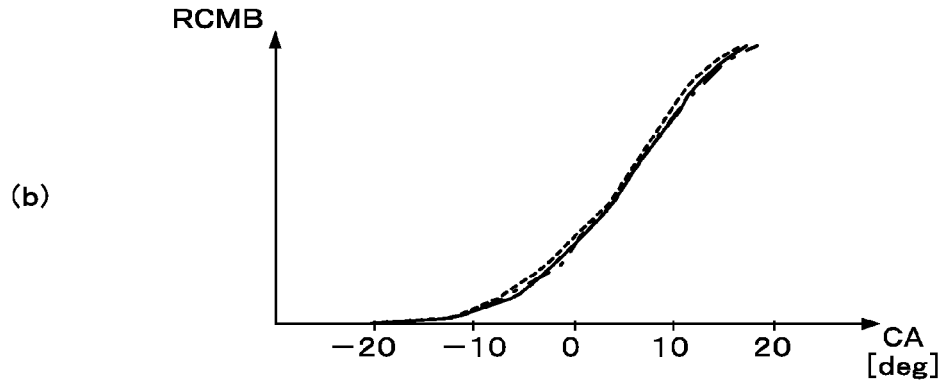
(b)

CONTROL APPARATUS FOR INTERNAL COMBUSTION ENGINE

TECHNICAL FIELD

The present invention relates to a control apparatus for an internal combustion engine, and particularly to the control apparatus for the internal combustion engine, which performs a control based on an exhaust gas recirculation ratio indicative of a ratio of exhaust gases (burnt gases) contained in the gases sucked into the combustion chamber of the engine.

BACKGROUND ART

Patent Document 1 (shown below) shows a method for calculating an exhaust gas recirculation ratio using an intake air amount sensor which detects an intake air amount of an engine. The detected intake air amount sometimes deviates from an actual intake air amount due to differences in the characteristic of the intake air amount sensor and other factors. According to the method shown in Patent Document 1, calculation accuracy of the exhaust gas recirculation ratio decreases if there is such deviation in the detected intake air amount.

Patent Document 2 shows an air-fuel ratio control apparatus in which influence of the detection deviation of the intake air amount sensor is reduced. According to this control apparatus, an air-fuel ratio feedback control amount is calculated according to an air-fuel ratio (oxygen concentration) detected in the exhaust system of the engine, and a feedback control of the air-fuel ratio is performed using the air-fuel ratio feedback control amount. Further, in a high load engine operating condition where the throttle valve is substantially fully opened, an upper limit value for the detected value of the intake air amount sensor is changed based on the air-fuel ratio feedback control amount, which particularly prevents control accuracy of the air-fuel ratio from deteriorating due to influence of the intake air blowback caused by the intake air pulsation.

PRIOR ART DOCUMENT

Patent Document

Patent Document 1: International Patent Publication No. WO2011/074302
Patent Document 2: Japanese Patent Laid-open No. 2005-325762

SUMMARY OF THE INVENTION

Problems to be Solved by the Invention

When the intake air amount sensor fails, or there is a disconnection in the exhaust gas recirculation passage, the evaporative fuel passage, and the like which are connected to the intake air system of the engine, the intake air amount detected by the intake air amount sensor greatly deviates from the actual intake air amount even when the engine is operating in an operating condition other the high load operating condition. Accordingly, calculation accuracy of the exhaust gas recirculation ratio deteriorates, which reduces control accuracy in the fuel supply control and ignition timing control which are performed according to the exhaust gas recirculation ratio calculated using the detected intake air amount.

In the fuel supply control, it is possible to maintain the actual air-fuel ratio at a desired value with the air-fuel ratio feedback control when the engine is operating in a steady state. On the other hand, in the ignition timing control, detection error in the intake air amount causes misfire or increase in the knocking. There is a room for improvement in the method of Patent Document 2, since abnormal conditions such as the above-described disconnection in passages are not taken into account.

The present invention was made contemplating the above-described point, and an objective of the present invention is to provide a control apparatus for an internal combustion engine, which appropriately performs a limit process for limiting the detected intake air amount applied to calculating the exhaust gas recirculation ratio within a range of values which are equal to or greater than a set lower limit value, thereby making it possible to prevent serious deterioration in control accuracy of the control using the exhaust gas recirculation ratio.

Solution to the Problem

To attain the above objective, the present invention provides a control apparatus for an internal combustion engine (1) having a throttle valve (3) disposed in an intake passage (2) of the engine, and an evaporative fuel passage (25) for supplying an evaporative fuel/air mixture to the intake passage, the evaporative fuel/air mixture being a mixture of air and evaporative fuel generated in a fuel tank for supplying fuel to the engine. This control apparatus characterized by comprising rotational speed detecting means, intake pressure detecting means, wide-open intake air amount calculating means, theoretical intake air amount calculating means, intake air amount detecting means, air-fuel ratio detecting means, air-fuel ratio correction amount calculating means, learning value calculating means, reference intake air amount calculating means, lower limit value setting means, limit process means, evaporative fuel/air mixture amount calculating means, intake gas amount calculating means, and exhaust gas recirculation ratio calculating means. The rotational speed detecting means detects a rotational speed (NE) of the engine, and the intake pressure detecting means detects an intake pressure (PBA) of the engine. The wide-open intake air amount calculating means calculates a wide-open intake air amount (GAWOT) according to the engine rotational speed (NW), the wide-open intake air amount (GAWOT) being an intake air amount corresponding to a state where the throttle valve (3) is fully opened. The theoretical intake air amount calculating means calculates a theoretical intake air amount (GATH) according to the wide-open intake air amount (GWOT) and the intake pressure (PBA), the theoretical intake air amount (GATH) being an intake air amount corresponding to a state where no exhaust gas of the engine is recirculated to a combustion chamber of the engine. The intake air amount detecting means detects an intake air amount (GACYLTMP) of the engine, and the air-fuel ratio detecting means detects an air-fuel ratio (KACT) in an exhaust passage (21) of the engine. The air-fuel ratio correction amount calculating means calculates an air-fuel ratio correction amount (KAF) according to the detected air-fuel ratio (KACT). The learning value calculating means calculates a learning value (KREFX) of the air-fuel ratio correction amount (KAF). The reference intake air amount calculating means calculates a reference intake air amount (GACYLREF) using the intake pressure (PBA), the engine rotational speed (NE), the air-fuel ratio correction amount (KAF), and the learning value (KREFX). The lower limit value setting means sets a lower limit value (GACLML) for the detected intake air amount (GACYLTMP) according to the reference intake air amount (GACYLREF). The limit process means performs a limit process for limiting the detected intake air amount (GACYLTMP) within a range of values which are equal to or greater than the lower limit value (GACLML). The evaporative fuel/air mixture amount calculating means for calculating an amount (GPGC) of the evaporative fuel/air mixture supplied through the evaporative fuel passage (25) to the intake passage (2). The intake gas amount calculating means calculates an intake gas amount (GINGASCYL) by correcting the limit-processed intake air amount (GAIRCYL) using the evaporative fuel/air mixture amount (GPGC). The exhaust gas recirculation ratio calculating means calculates an exhaust gas recirculation ratio (REGRT) using the theoretical intake air amount (GAWOT) and the intake gas amount (GINGASCYL). The engine is controlled using the exhaust gas recirculation ratio (REGRT).

With this configuration, the wide-open intake air amount, which is an intake air amount corresponding to the state where the throttle valve is fully opened, is calculated according to the engine rotational speed, and the theoretical intake air amount, which is an intake air amount corresponding to the state where no exhaust gas of the engine is recirculated to the combustion chamber of the engine, is calculated according to the wide-open intake air amount and the intake pressure. Further, an amount of the evaporative fuel/air mixture supplied through the evaporative fuel passage to the intake passage is calculated, the intake gas amount is calculated by correcting the intake air amount using the evaporative fuel/air mixture amount, the exhaust gas recirculation ratio is calculated using the theoretical intake air amount and the intake gas amount, and the engine is controlled using the calculated exhaust gas recirculation ratio. Further, an air-fuel ratio correction amount is calculated according to the detected air-fuel ratio, a learning value of the air-fuel ratio correction amount is calculated, a reference intake air amount is calculated using the intake pressure, the engine rotational speed, the air-fuel ratio correction amount, and the learning value. A lower limit value of the detected intake air amount is calculated according to the reference intake air amount, and a limit process for limiting the detected intake air amount within a range of values which are equal to or greater than the lower limit value, is performed. Accordingly, an accurate value of the exhaust gas recirculation ratio is obtained taking the evaporative fuel/air mixture into account with a comparatively simple calculation, which makes it possible to enhance accuracy of the engine control. Further, the lower limit value of the detected intake air amount is set using the air-fuel ratio correction amount and its learning value, the air-fuel ratio correction amount reflecting an actual air-fuel ratio of the air/fuel mixture burning in the engine. Accordingly, the limit process for limiting the detected intake air amount within a range of values which are equal to or greater than the set lower limit value, is appropriately performed, for example, upon failure of the intake air amount detecting means, or when disconnection of the evaporative fuel passage occurs, which makes it possible to avoid serious deterioration in accuracy of the engine control using the exhaust gas recirculation ratio.

Preferably, the control apparatus further comprises optimum ignition timing calculating means for calculating an optimum ignition timing (IGMBT) at which an output of the engine becomes maximum, according to the exhaust gas recirculation ratio (REGRT), wherein an ignition timing of the engine is controlled using the optimum ignition timing (IGMBT).

With this configuration, the optimum ignition timing is calculated according to the exhaust gas recirculation ratio, and the ignition timing is controlled using the calculated optimum ignition timing. It is confirmed that the relationship between the exhaust gas recirculation ratio and the optimum ignition timing is not affected by the operating phase of the intake valve or whether the external exhaust gas recirculation is performed or not. Accordingly, by setting the optimum ignition timing according to the exhaust gas recirculation ratio, the optimum ignition timing suitable for the engine operating condition can easily be calculated.

Preferably, the control apparatus further comprises knocking detecting means (14) for detecting knocking of the engine, retard correction amount calculating means, and fail-safe process means. The retard correction amount calculating means calculates a retard correction amount (DIGKCS) of the ignition timing so that the retard correction amount (DIGKCS) increases as a detection frequency of the knocking by the knocking detecting means becomes higher. The fail-safe process means replaces the limit-processed intake air amount (GAIRCYL) with the reference intake air amount (GACYLREF), when the retard correction amount (DIGKCS) reaches a retard limit value (DIGKMAX). The ignition timing control of the engine is performed using the retard correction amount (DIGKCS).

With this configuration, a retard correction amount of the ignition timing is calculated so that the retard correction amount increases as a detection frequency of the knocking by the knocking detecting means becomes higher, and the ignition timing control is performed using the retard correction amount. The fail-safe process is performed so that the limit-processed intake air amount is replaced with the reference intake air amount, when the retard correction amount reaches the retard limit value. Accordingly, knocking is surely prevented from occurring in the condition where the detected intake air amount greatly deviates from the actual intake air amount.

Further, the engine has an exhaust gas recirculation passage (22) for recirculating exhaust gases from the exhaust passage (21) to the intake passage (2), and the control apparatus preferably includes estimated recirculated gas amount calculating means, and abnormality determining means. The estimated recirculated gas amount calculating means calculates an estimated recirculated gas amount (GEGREXE) which is an estimated value of an amount of gases flowing through the exhaust gas recirculation passage (22) into the intake passage (2). The abnormality determining means determines that the exhaust gas recirculation passage (22) is abnormal, when an air-fuel ratio determination parameter (KAFDET) is within a predetermined range set according to the detected intake air amount (GACYLTMP) and the estimated recirculated gas amount (GEGREXE), the air-fuel ratio determination parameter (KAFDET) being obtained by dividing the air-fuel ratio correction amount (KAF) by the learning value (KREFX). The reference intake air amount calculating means modifies the reference intake air amount (GACYLREF) by multiplying the air-fuel ratio determination parameter (KAFDET) with the reference intake air amount (GACYLREF=GACYLREF2) when the following conditions are satisfied: a target value (REGREXCMD) of an external exhaust gas recirculation ratio through the exhaust gas recirculation passage (22) is equal to or greater than a predetermined value (REGREXTH); the engine is in a predetermined high load operating condition; the exhaust gas recirculation passage (22) is determined to be abnormal by the abnormality determining means; and the retard correction amount (DIGKCS) reaches the retard limit value (DIGKMAX). The fail-safe process means replaces the limit-processed intake air amount (GAIRCYL) with the modified reference intake air amount (GACYLREF).

With this configuration, the estimated recirculated gas amount which is an estimated value of an amount of gases flowing through the exhaust gas recirculation passage into the intake passage, is calculated, and it is determined that the exhaust gas recirculation passage is abnormal, when the air-fuel ratio determination parameter is within a predetermined range set according to the detected intake air amount and the estimated recirculated gas amount, the air-fuel ratio determination parameter being obtained by dividing the air-fuel ratio correction amount by the learning value. The reference intake air amount is modified by multiplying the air-fuel ratio determination parameter with the reference intake air amount when the following conditions are satisfied: the target value of the external exhaust gas recirculation ratio through the exhaust gas recirculation passage is equal to or greater than a predetermined value; the engine is in the predetermined high load operating condition; the exhaust gas recirculation passage is determined to be abnormal; and the retard correction amount reaches the retard limit value, and the fail-safe process for replacing the limit-processed intake air amount with the modified reference intake air amount, is performed. Upon occurrence of disconnection of the exhaust gas recirculation passage, the reference intake air amount calculated according to the intake pressure greatly deviates from the actual intake air amount. Accordingly, using the reference intake air amount modified by multiplying the air-fuel ratio determination parameter, makes it possible to approximate the actual intake air amount with high accuracy. Consequently, by replacing the limit-processed intake air amount with the modified reference intake air amount, knocking can be surely prevented from occurring when the disconnection of the exhaust gas recirculation passage occurs, and new air flows into the intake passage from the exhaust gas recirculation passage. Further, by using the air-fuel ratio determination parameter obtained by dividing the air-fuel ratio correction amount by the learning value, influence of differences in characteristics of fuel injection valves or the intake air amount detecting means can be removed, which makes it possible to perform the modification with high accuracy.

Preferably, the control apparatus further comprises evaporative fuel concentration calculating means, corrected intake air amount calculating means, knock limit ignition timing calculating means, and knock limit ignition timing calculating means. The evaporative fuel concentration calculating means calculates an evaporative fuel concentration in the evaporative fuel/air mixture. The corrected intake air amount calculating means calculates a corrected intake air amount (GAIRCYLC) by correcting the intake air amount (GAIRCYL) with a fresh air amount (GPGACYL) in the evaporative fuel/air mixture, the fresh air amount (GPGACYL) being calculated according to the evaporative fuel/air mixture amount (GPGC) and the evaporative fuel concentration (KAFEVACT). The knock limit ignition timing calculating means calculates a knock limit ignition timing (IGKNOCK) according to the exhaust gas recirculation ratio (REGRT) and the corrected intake air amount (GAIRCYLC), the knock limit ignition timing (IGKNOCK) corresponding to an occurrence limit of knocking in the engine. The ignition timing control is performed using any one of the optimum ignition timing (IGMBT) and the knock limit ignition timing that is set to a more retarded value.

With this configuration, the evaporative fuel concentration in the evaporative fuel/air mixture is calculated, and the corrected intake air amount is calculated by correcting the intake air amount with the secondary fresh air amount, which is calculated according to the evaporative fuel/air mixture amount and the evaporative fuel concentration. Further, the knock limit ignition timing is calculated according to the exhaust gas recirculation ratio and the corrected intake air amount. The knock limit ignition timing is highly correlated with the exhaust gas recirculation ratio. Accordingly, calculating the knock limit ignition timing according to the exhaust gas recirculation ratio, makes it possible to perform the ignition timing control with high accuracy. The engine output is therefore maximized within the range for surely avoiding the knocking. In addition, the amount of fresh air sucked into the cylinder is equal to a sum of the intake air amount and the fresh air amount in the evaporative fuel/air mixture. Accordingly, calculating the knock limit ignition timing according to the corrected intake air amount in addition to the exhaust gas recirculation ratio, makes it possible to improve calculation accuracy of the knock limit ignition timing.

BRIEF DESCRIPTION OF THE DRAWINGS

FIG. 7 shows a relationship between the total exhaust gas recirculation ratio (REGRT) and the optimum ignition timing (IGMBT).

FIGS. 8(a) and 8(b) show changes in the mass combustion rate (RCMB).

MODE FOR CARRYING OUT THE INVENTION

Preferred embodiments of the present invention will now be described with reference to the drawings.

Figure 1:
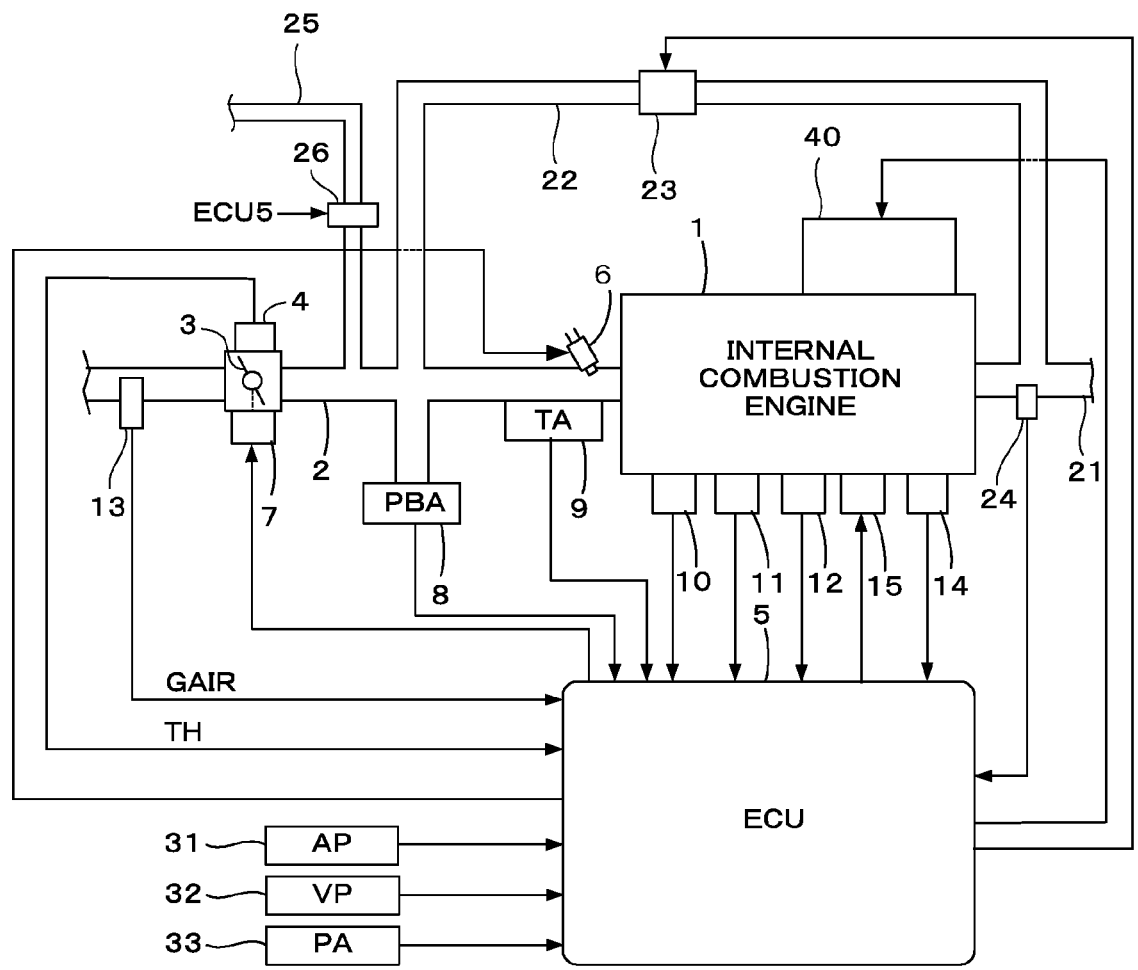
FIG. 1 shows a configuration of an internal combustion engine according to one embodiment of the present invention and a control apparatus therefor.
Figure 2:
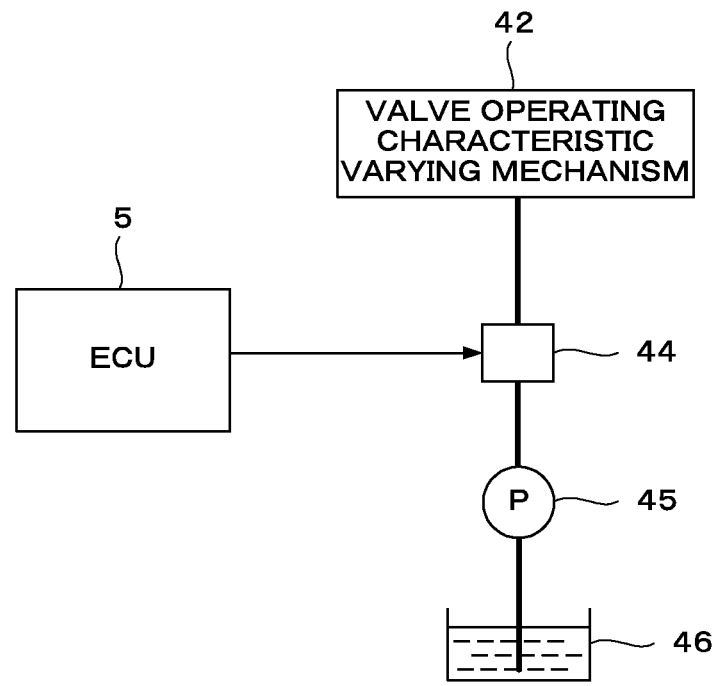
FIG. 2 is a diagram showing a configuration of a valve operating characteristic varying device shown in FIG. 1.

FIG. 1 is a schematic diagram showing a configuration of an internal combustion engine and a control apparatus therefor according to one embodiment of the present invention. FIG. 2 is a schematic diagram showing a configuration of a valve operating characteristic varying device. Referring to FIG. 1, an internal combustion engine (hereinafter referred to as "engine") 1 having, for example, four cylinders is provided with intake valves, exhaust valves, and cams for driving the intake valves and the exhaust valves. The engine 1 is provided with a valve operating characteristic varying device 40 having a valve operating characteristic varying mechanism 42 as a cam phase varying mechanism for continuously varying the operating phase of the cams for driving the intake valves with reference to a rotational angle of the crank shaft of the engine 1. The valve operating characteristic varying mechanism 42 varies the operating phase of the cam for driving each intake valve, and consequently varies the operating phase of each intake valve.

The engine 1 has an intake passage 2 provided with a throttle valve 3. A throttle valve opening sensor 4 for detecting an opening of the throttle valve 3 is connected to the throttle valve 3. The detection signal of the throttle valve opening sensor 4 is supplied to an electronic control unit (referred to as "ECU") 5. An actuator 7 for actuating the throttle valve 3 is connected to the throttle valve 3, and the operation of the actuator 7 is controlled by the ECU 5.

The intake passage 2 is provided with an intake air flow rate sensor 13 for detecting an intake air flow rate GAIR of the engine 1. The detection signal of the intake air flow rate sensor 13 is supplied to the ECU 5.

An evaporative fuel passage 25 is connected to the intake passage 2 downstream of the throttle valve 3, and the evaporative fuel passage 25 is connected to a canister (not shown). The evaporative fuel passage 25 is provided with a purge control valve 26 for controlling a flow rate of an evaporative fuel and air mixture (an evaporative fuel/air mixture, which is hereinafter referred to as "purge gas"). Operation of the purge control valve 26 is controlled by the ECU 5. The canister stores evaporative fuel generated in the fuel tank which supplies fuel to the engine 1. When opening the purge control valve 26, the purge gas is supplied from the canister through the evaporative fuel passage 25 to the intake passage 2.

An exhaust gas recirculation passage 22 is disposed between an exhaust passage 21 and the intake passage 2, and connected to the intake passage 2 downstream of the throttle valve 3. The exhaust gas recirculation passage 22 is provided with an exhaust gas recirculation control valve 23 for controlling a recirculation amount of exhaust gases. Operation of the exhaust gas recirculation control valve 23 is controlled by the ECU 5.

The exhaust passage 21 is provided with an oxygen concentration sensor 24 (hereinafter referred to as "LAF sensor 24"). The LAF sensor 24 supplies a detection signal which is substantially proportional to an oxygen concentration in the exhaust gases (air/fuel ratio).

Fuel injection valves 6 are inserted into the intake pipe 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

A spark plug 15 of each cylinder of the engine 1 is connected to the ECU 5. The ECU 5 supplies an ignition signal to each spark plug 15 and controls the ignition timing.

An intake pressure sensor 8 for detecting an intake pressure PBA and an intake air temperature sensor 9 for detecting an intake air temperature TA are disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of a crankshaft (not shown) of the engine 1, and the cam angle position sensor 12 is provided to detect a rotational angle of the camshaft to which the cams for driving the intake valves of the engine 1 are fixed. A signal corresponding to the rotational angle detected by the crank angle position sensor 11 and a signal corresponding to the rotational angle detected by the cam angle position sensor 12 are supplied to the ECU 5. The crank angle position sensor 11 generates one pulse (hereinafter referred to as "CRK pulse") at every constant crank angle period (e.g., a period of 6 degrees) and a pulse for specifying a predetermined angle position of the crankshaft. The cam angle position sensor 12 generates a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used to control various timings such as the fuel injection timing and the ignition timing, as well as to detect an engine rotational speed NE. An actual operating phase CAIN of the camshaft is detected based on the correlation between the TDC pulse output from the cam angle position sensor 12 and the CRK pulse output from the crank angle position sensor 11.

A knock sensor 14 for detecting a high frequency vibration is mounted on a proper position of the engine 1. The detection signal of the knock sensor 14 is supplied to the ECU 5. Further, an accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (the depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The valve operating characteristic varying device 40, as shown in FIG. 2, includes a valve operating characteristic varying mechanism 42 and a solenoid valve 44. The valve operating characteristic varying mechanism 42 continuously varies an operating phase of each intake valve. An opening of the solenoid valve 44 is continuously varied to change the operating phase of each intake valve. The operating phase CAIN of the camshaft is used as a parameter indicative of the operating phase of the intake valve (hereinafter referred to as "intake valve operating phase CAIN"). A lubricating oil in an oil pan 46 is pressurized by an oil pump 45, and supplied to the solenoid valve 44. It is to be noted that a specific configuration of the valve operating characteristic varying mechanism 42 is described, for example, in Japanese Patent Laid-open No. 2000-227013.

Figure 3:
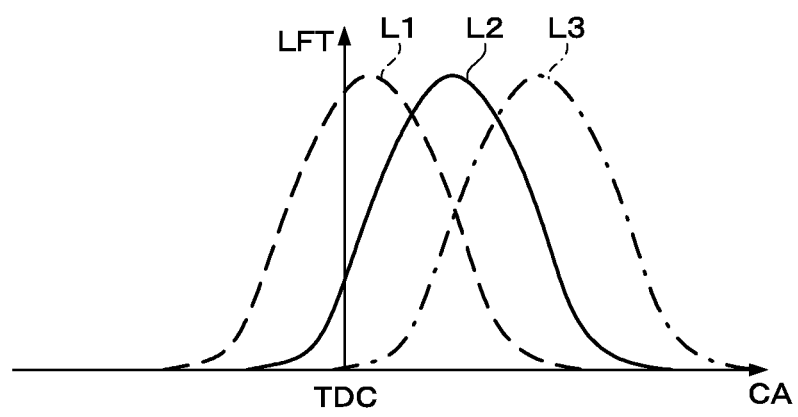
FIG. 3 shows changes in the operating phase of the intake valve.

According to the valve operating characteristic varying mechanism 42, the intake valve is driven with a phase from the most advanced phase shown by the broken line L1 in FIG. 3 to the most retarded phase shown by the dot-and-dash line L3, depending on a change in the operating phase CAIN of the camshaft. In FIG. 3, the characteristic shown by the solid line L2 is the center of the variable phase range. In this embodiment, the intake valve operating phase CAIN is defined as an advancing angular amount from the most retarded phase.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, the ignition plugs 15, the exhaust gas recirculation control valve 23, and the solenoid valve 44.

The CPU in the ECU 5 performs the ignition timing control, the opening control of the throttle valve 3, the control of an amount of fuel to be supplied to the engine 1 (the opening period of each fuel injection valve 6), the exhaust gas recirculation amount control with the exhaust gas recirculation control valve 23, and the valve operating characteristic control with the solenoid valve 44, according to the detection signals from the above-described sensors.

The opening period TOUT of the fuel injection valve 6 is calculated by the following equation (1).

$$TOUT = TIM \times KCMD \times KAF \times KTOTAL \tag{1}$$

In the equation (1), TIM is a basic fuel amount, which is specifically a basic fuel injection period of the fuel injection valve 6, and determined by retrieving a TIM table which is set according to the intake air flow rate GAIR. The TIM table is set so that the air-fuel ratio of air-fuel mixture supplied to the engine is substantially equal to the stoichiometric air-fuel ratio.

KCMD is a target air-fuel ratio coefficient which is set according to the operating condition of the engine 1. The target air-fuel ratio coefficient KCMD is proportional to a reciprocal of the air-fuel ratio A/F, i.e., proportional to a fuel-air ratio F/A, and takes a value of "1.0" when the air-fuel ratio is equal to the stoichiometric air-fuel ratio. The target air-fuel ratio coefficient KCMD is therefore referred to also as "target equivalent ratio".

KAF is an air-fuel ratio correction coefficient calculated using a PID (proportional, integral, and differential) control method or an adaptive control method using a self-tuning regulator so that a detected equivalent ratio KACT calculated from a detected value of the LAF sensor 24 coincides with the target equivalent ratio KCMD when an execution condition of the air-fuel ratio feedback control is satisfied.

KTOTAL is a product of other correction coefficients (a correction coefficient KTW set according the engine coolant temperature TW, a correction coefficient KTA set according to the intake air temperature TA, and the like) computed according to various engine parameter signals.

Next, an outline of a method for calculating an exhaust gas recirculation ratio in this embodiment is described below. In the following description, the dimension of gas amounts, such as "intake air amount", "recirculated exhaust gas amount", and the like is specifically a mass of gases per 1 TDC period (=a generation period of the TDC pulse, for example, a period of 180-degree rotation of the crankshaft, as to the 4-cylinder engine).

Figure 4:
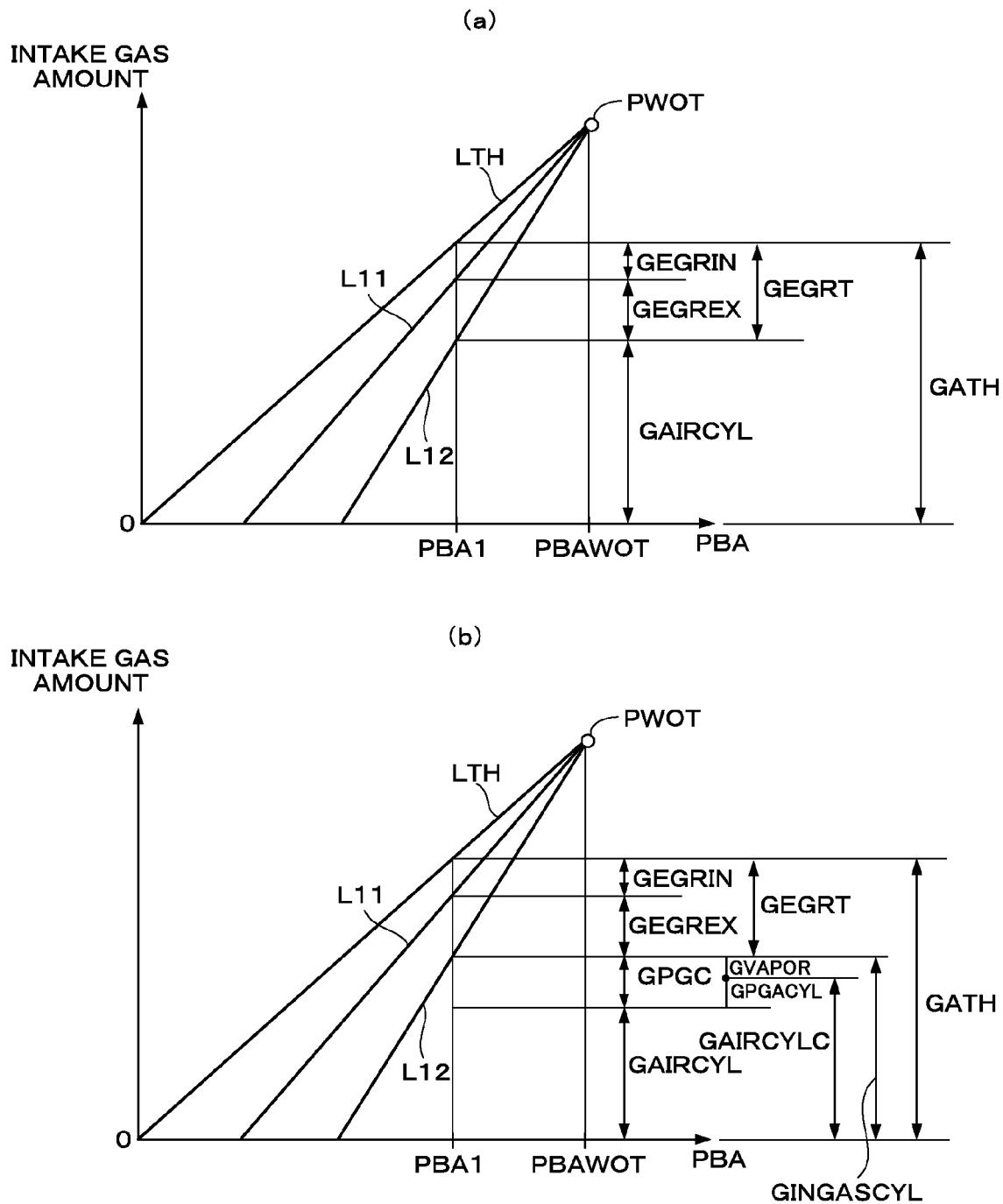
FIGS. 4(a) and 4(b) are graphs for illustrating a calculation method of the total exhaust gas recirculation ratio (REGRT).

FIGS. 4($a$) and 4($b$) are graphs for illustrating a calculation method of a total exhaust gas recirculation ratio (hereinafter referred to as "total EGR ratio") REGRT in this embodiment. FIGS. 4($a$) and 4($b$) show a relationship between the intake pressure PBA and an amount of gases supplied to the engine (an amount of air+an amount of recirculated exhaust gases). The relationship of FIGS. 4($a$) and 4($b$) are obtained under the condition that the engine rotational speed NE and the intake valve operating phase CAIN are constant. The total EGR ratio REGRT is a ratio of the total exhaust gas recirculation amount with respect to the total intake gas amount (theoretical intake air amount GATH) (refer to the equations (12) and (15) described later). The total exhaust gas recirculation amount is a sum of the internal exhaust gas recirculation amount and the external exhaust gas recirculation amount through the exhaust gas recirculation passage 22. FIG. 4($a$) corresponds to the state in which the purge control valve 26 is closed and the purge gas is not supplied to the intake passage 2 (hereinafter referred to as "purge stop state"), and FIG. 4($b$) corresponds to the state in which the purge control valve 26 is opened and the purge gas is supplied to the intake passage 2 (hereinafter referred to as "purge execution state").

In FIGS. 4($a$) and 4($b$), the operating point PWOT corresponds to the state where the throttle valve 3 is fully opened, and indicates the theoretical operating point at which no external exhaust gas recirculation is performed, and no internal exhaust gas recirculation is performed. At the operating point PWOT, the intake air amount takes the maximum value under the condition that the engine rotational speed NE is constant. It is to be noted that the residual gas ratio (the internal exhaust gas recirculation ratio) does not actually become "0" in the state where the throttle valve 3 is fully opened. However, the internal exhaust gas recirculation ratio takes the minimum value, since the intake pressure PBAWOT becomes almost equal to the atmospheric pressure PA. The straight line LTH passing the operating point PWOT and the starting point, indicates a theoretical relationship between the intake air amount and the intake pressure, wherein no external exhaust gas recirculation and no internal exhaust gas recirculation is performed. This straight line LTH is hereinafter referred to as "theoretical intake air amount straight line LTH". The line L11 indicates a relationship corresponding to the state where only the internal exhaust gas recirculation is performed, and the line L12 indicates a relationship corresponding to the state where both of the internal exhaust gas recirculation and the external exhaust gas recirculation are performed. It is to be noted that the lines L11 and L12 are indicated as straight lines for explanation, although they are not actually straight lines.

Firstly, the calculation method of the total EGR ratio REGRT in the purge stop state is described below referring FIG. 4($a$).

If the gas amount on the theoretical intake air amount straight line LTH corresponding to the state where the intake pressure is equal to PBA1 is defined as a "theoretical intake air amount GATH", the theoretical intake air amount GATH is expressed with the following equation (11). In the equation (11), GAIRCYL indicates an intake air amount (fresh air amount), and GEGRIN, GEGREX, and GEGRT respectively indicate an internal exhaust gas recirculation amount, an external exhaust gas recirculation amount, and a total exhaust gas recirculation amount.

$$GATH = GAIRCYL + GEGRIN + GEGREX \quad (11)$$
$$= GAIRCYL + GEGRT$$

Accordingly, the total EGR ratio REGRT is calculated by the following equation (12).

$$REGRT = GEGRT/GATH \quad (12)$$
$$= (GATH - GAIRCYL)/GATH$$

On the other hand, in the purge execution state, the theoretical intake air amount OATH is given by the following equation (13). In the equation (13), GPGC is an amount of the purge gas supplied through the evaporative fuel passage 26 to the intake passage 2. The purge gas amount GPGC is expressed, with the following equation (14), as a sum of an amount GVAPOR of the evaporative fuel contained in the purge gas and an amount GPGACYL of fresh air contained in the purge gas. GPGACYL is hereinafter referred to as "secondary fresh air amount". Further, GINGASCYL in the equation (13) is a sum of the intake air amount GAIRCYL and the purge gas amount GPGC. GINGASCYL is hereinafter referred to as "intake gas amount".

$$GATH = GAIRCYL + GPGC + GEGRIN + GEGREX \quad (13)$$
$$= GINGASCYL + GEGRT$$
$$GPGC = GVAPOR + GPGACYL \quad (14)$$

Accordingly, the total EGR ratio REGRT is calculated by the following equation (15).

$$REGRT = GEGRT/GATH \quad (15)$$
$$= (GATH - GINGASCYL)/GATH$$

It is to be noted that a corrected intake air amount GAIRCYLC (refer to FIG. 4(b)), which is calculated by adding the secondary fresh air amount GPGACYL and the intake air amount GAIRCYL, is used in the control of the ignition timing IGLOG as described later.

By setting the purge gas amount GPGC to "0" in the equations (13) and (15) corresponding to the purge execution state, the equations (11) and (12) corresponding to the purge stop state are obtained. Therefore, the equations (13) and (15) corresponding to the purge execution state are used as basic equations in the following description.

Figure 5:
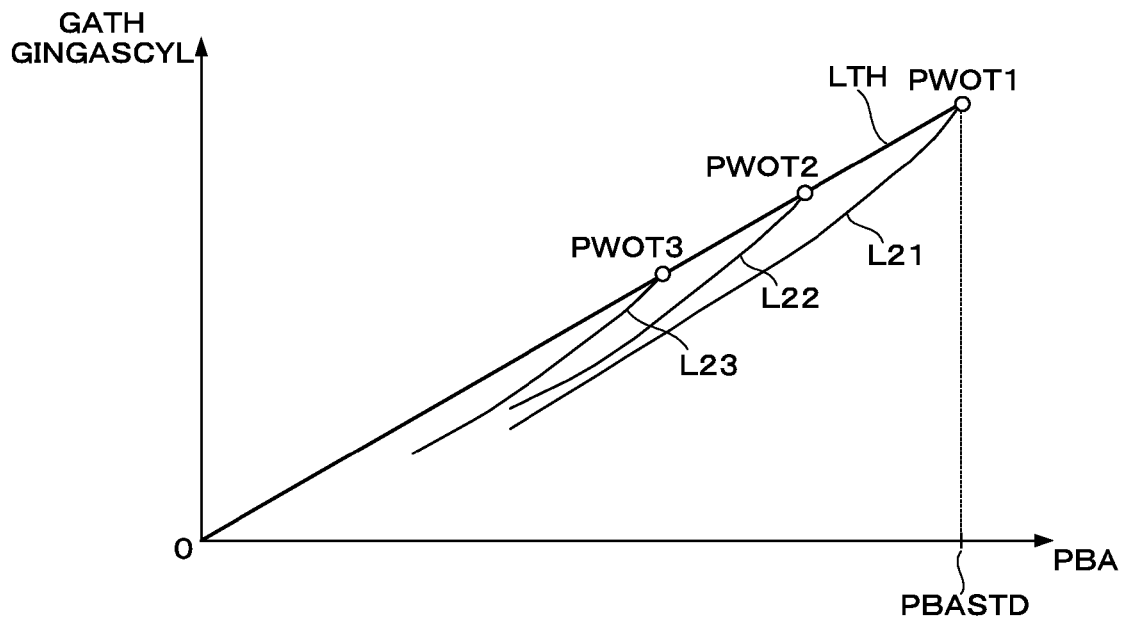
FIG. 5 is a graph for illustrating changes in the theoretical wide-open air amount (GAWOT) corresponding to changes in the atmospheric pressure.

FIG. 5 is a graph for illustrating a case where the atmospheric pressure changes. In FIG. 5, the wide-open operating point PWOT1 is an operating point corresponding to a reference state in which the intake pressure PBA is equal to a reference intake pressure PBASTD (for example, 100 kPa (750 mmHg)). When the vehicle moves to a higher altitude place and the atmospheric pressure falls, the operating point PWOT1 moves to the operating point PWOT2 and next to the operating point PWOT3 on the theoretical intake air amount straight line LTH. The curves L21-L23 starting from the operating points PWOT1-PWOT3 respectively indicate the intake gas amount GINGASCYL which is obtained by taking the internal exhaust gas recirculation into account (i.e., when no external exhaust gas recirculation is performed).

As described above, in this embodiment, it is not necessary to change the theoretical intake air amount straight line LTH depending on changes in the atmospheric pressure, and the total EGR ratio REGRT can accurately be calculated also at high altitude places.

However, it is necessary to perform an air density correction depending on changes in the intake air temperature TA, and the air density correction is performed according to the detected intake air temperature TA using the following equation (16). In the equation (16), TASTD is an intake air temperature in a reference condition (for example, 25 degrees C.), and GAWOTSTD is an intake air amount corresponding to the wide-open operating point PWOT in the reference condition. GAWOTSTD is hereinafter referred to as "reference theoretical wide-open air amount GAWOTSTD". Further, GAWOT is an intake air amount corresponding to the wide-open operating point PWOT in the operating condition of the detected intake air temperature TA. GAWOT is hereinafter referred to as "theoretical wide-open air amount GAWOT". "n" in the equation (16) is a constant which is empirically set to a value from "0" to "1", for example, set to "0.5".

[Eq. 1]

$$GAWOT = GAWOTSTD \times \left(\frac{TASTD + 273}{TA + 273}\right)^n \quad (16)$$

Figure 6:
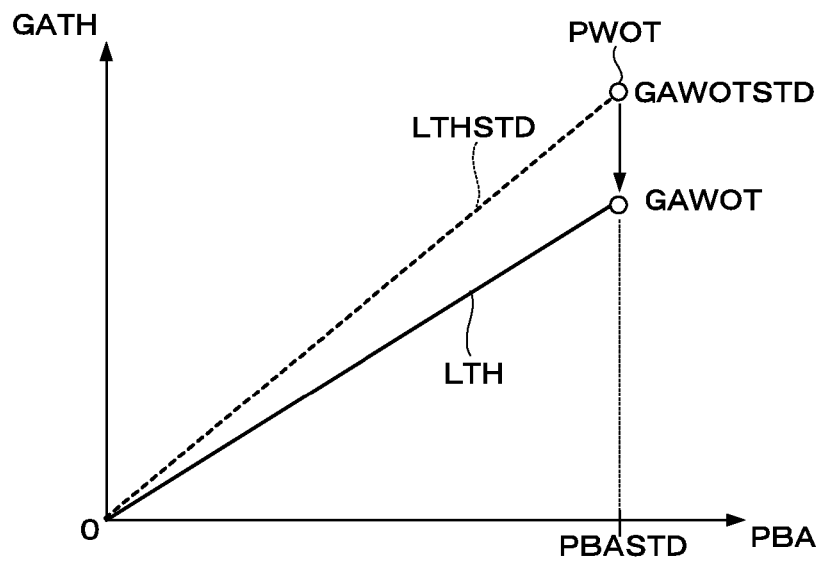
FIG. 6 is a graph for illustrating a correction according to the intake air temperature.

The straight line LTHSTD shown in FIG. 6 is a theoretical intake air amount straight line in the reference condition, and the straight line LTH is a theoretical intake air amount straight line corresponding to the detected intake air temperature TA. It is to be noted that FIG. 6 corresponds to an example in which the detected intake air temperature TA is higher than the reference intake air temperature TASTD.

FIG. 7 is a graph for illustrating a relationship between the total EGR ratio REGRT and an optimum ignition timing IGMBT (the engine rotational speed NE is fixed). The optimum ignition timing IGMBT is an ignition timing at which the engine output torque becomes the maximum. In FIG. 7, the black circles (●) and the white circles (○) correspond to an operating condition where the intake valve operating phase CAIN is "0" degree, the black squares (■) and the white squares (□) correspond to an operating condition where the intake valve operating phase CAIN is "20" degrees, and the black triangles (▲) and the white triangles (△) correspond to an operating condition where the intake valve operating phase CAIN is "45" degrees. Further, the black symbols (●, ■, and ▲) correspond to the case where no external exhaust gas recirculation is performed (only the internal exhaust gas recirculation is performed), and the white symbols (○, □, and △) correspond to the case where the external exhaust gas recirculation is performed (both of the internal exhaust gas recirculation and the external exhaust gas recirculation are performed).

According to FIG. 7, it is confirmed that the relationship between the total EGR ratio REGRT and the optimum ignition timing IGMBT depends neither on the operating phase CAIN of the intake valve nor on whether the external exhaust gas recirculation is performed or not, i.e., the curve L31 can represent the relationship between REGRT and IGMBT.

Accordingly, only one optimum ignition timing calculation map (IGMBT map) set according to the engine rotational speed NE and the total EGR ratio REGRT, makes it possible to set the optimum ignition timing corresponding to all engine operating conditions. Consequently, the manpower for setting maps can greatly be reduced.

FIGS. 8(a) and 8(b) show changes in the mass combustion rate RCMB of the air-fuel mixture sucked in the combustion chamber (the horizontal axis indicates the crank angle CA). FIG. 8(a) shows changes in the mass combustion rate RCMB in a condition where the charging efficiency ηc is constant and the total EGR ratio REGRT is changed. Specifically, the curves L41-L43 correspond respectively to operating conditions in which the total EGR ratio REGRT is set to "6.3%", "16.2%, and "26.3%". The curve L41 indicates the fastest burning speed. That is, it is confirmed that the total EGR ratio REGRT is a main factor which changes the burning speed of the air-fuel mixture.

On the other hand, FIG. 8(b) shows changes in the mass combustion rate RCMB in a condition where the total EGR ratio REGRT is constant and the charging efficiency ηc is changed (the solid line, the dashed line, and the dot-and-dash line). The three lines indicated in FIG. 8(b) almost overlap with each other, which shows that the burning speed of the air-fuel mixture hardly changes even if the charging efficiency ηc is changed. It is therefore preferable that the optimum ignition timing IGMBT is set not according to the charging efficiency ηc (the fresh intake air amount) but according to the total EGR ratio REGRT.

Figure 9:
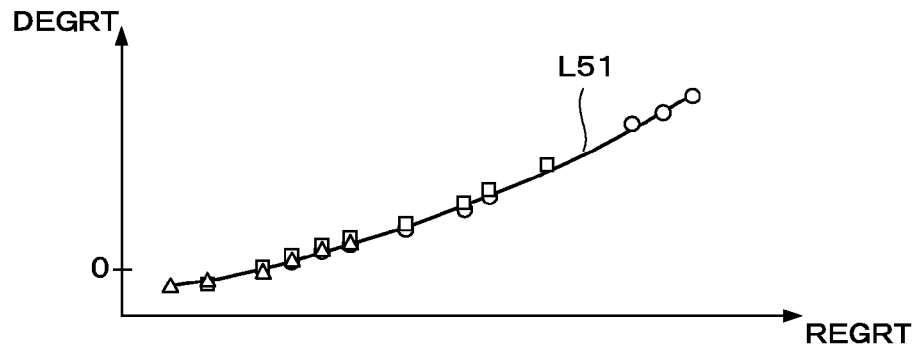
FIG. 9 shows a relationship between the total exhaust gas recirculation ratio (REGRT) and an EGR knocking correction amount (DEGRT).

FIG. 9 shows a relationship between the total EGR ratio REGRT and an EGR knock correction amount DEGRT of the ignition timing (the engine rotational speed NE is fixed). The EGR knock correction amount DEGRT is an ignition timing correction amount (a correction amount in the advancing direction) applied to a calculation of a knock limit ignition timing IGKNOCK, in order to perform the correction corresponding to changes in the exhaust gas recirculation amount. The knock limit ignition timing IGKNOCK corresponds to an occurrence limit of knocking in the engine, i.e., the most advanced ignition timing at which no knocking occurs. The symbols ○, □, and Δ in FIG. 9 indicate data corresponding to three different charging efficiencies ηc, and it is confirmed that the relationship does not depend on the charging efficiency ηc. Accordingly, the curve L51 can represent the relationship between the total EGR ratio REGRT and the EGR knock correction amount DEGRT under the condition that the engine rotational speed NE is fixed. Consequently, the EGR knock correction amount DEGRT can appropriately be set by using the DEGRT map which is set according to the engine rotational speed NE and the total EGR ratio REGRT. It is to be noted that a modification according to the intake valve operating phase CAIN may be necessary due to differences in the engine characteristics, although the relationship indicated with the curve L51 is basically independent of the intake valve operating phase CAIN. In such case, two or more tables corresponding to different intake valve operating phases CAIN may be used, or the correction according to the intake valve operating phase CAIN may be performed.

Figure 10:
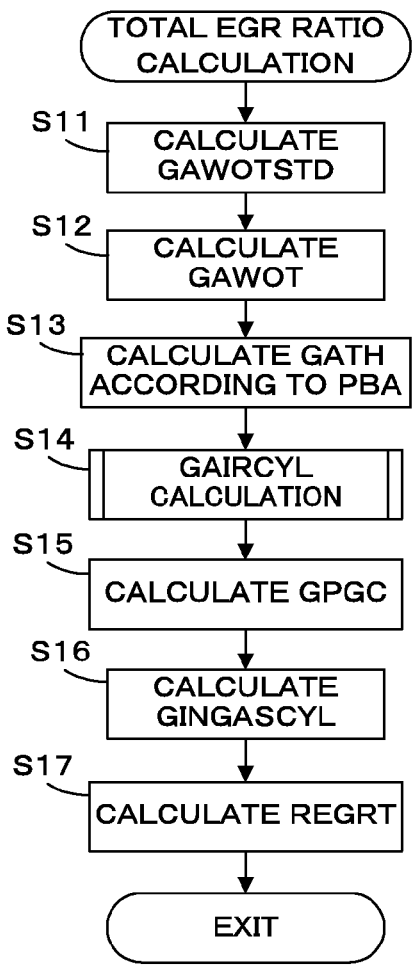
FIG. 10 is a flowchart of a process for calculating the total exhaust gas recirculation ratio (first embodiment).

FIG. 10 is a flowchart of a process for calculating the total EGR ratio REGRT. This process is executed by the CPU in the ECU 5 in synchronism with generation of the TDC pulse.

In step S11, a GAWOTSTD map which is set according to the engine rotational speed NE and the intake valve operating phase CAIN, is retrieved to calculate the reference theoretical wide-open air amount GAWOTSTD. In step S12, the correction according to the intake air temperature TA with the above-described equation (16) is performed to calculate the theoretical wide-open air amount GAWOT.

In step S13, the detected intake pressure PBA is applied to the following equation (17) to calculate the theoretical intake air amount GATH.

$$GATH=GAWOT \times PBA/PBASTD \quad (17)$$

Figure 11:
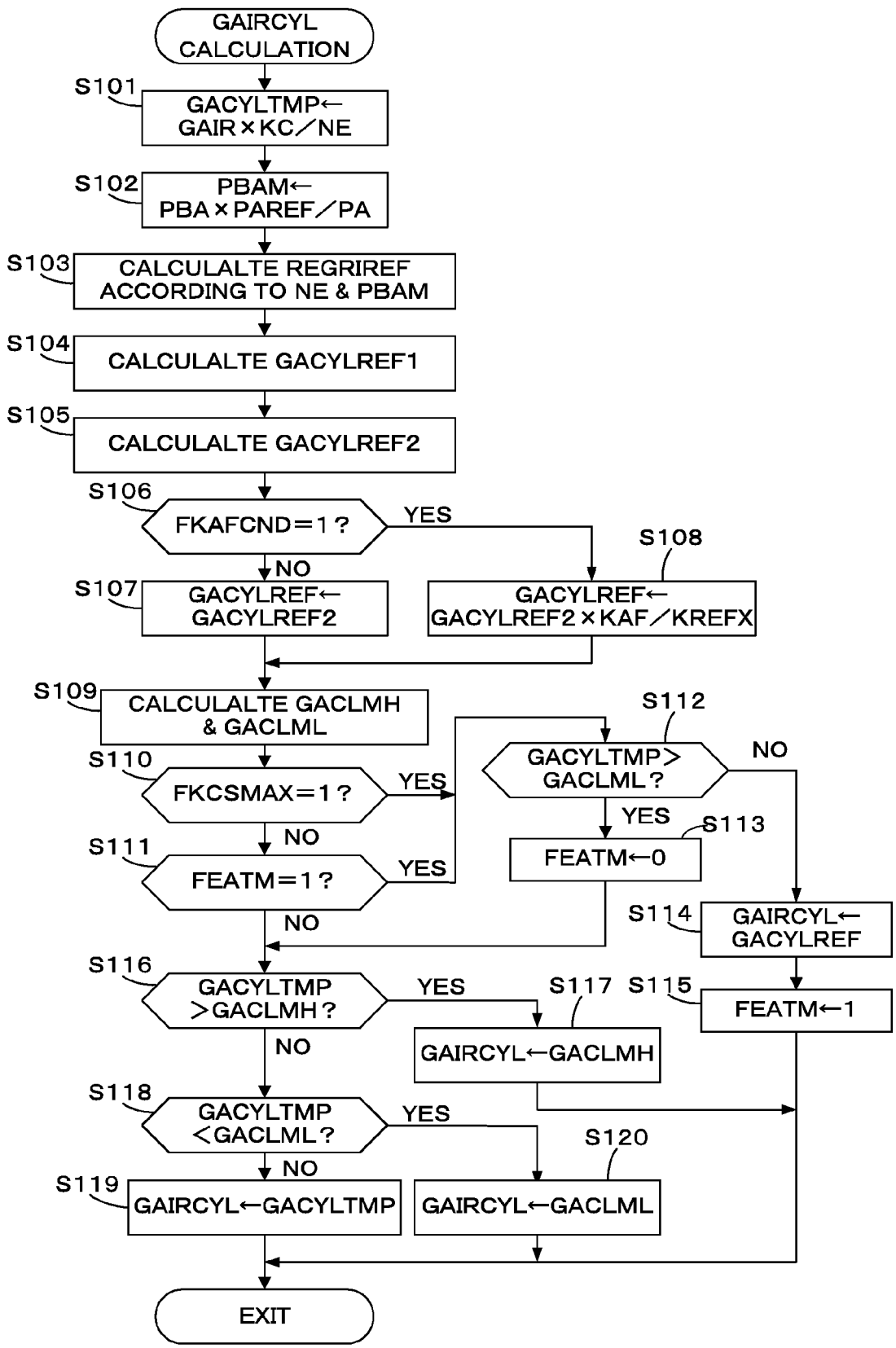
FIG. 11 is a flowchart of an intake air amount (GAIRCYL) calculation process executed in the process of FIG. 10.
Figure 13:
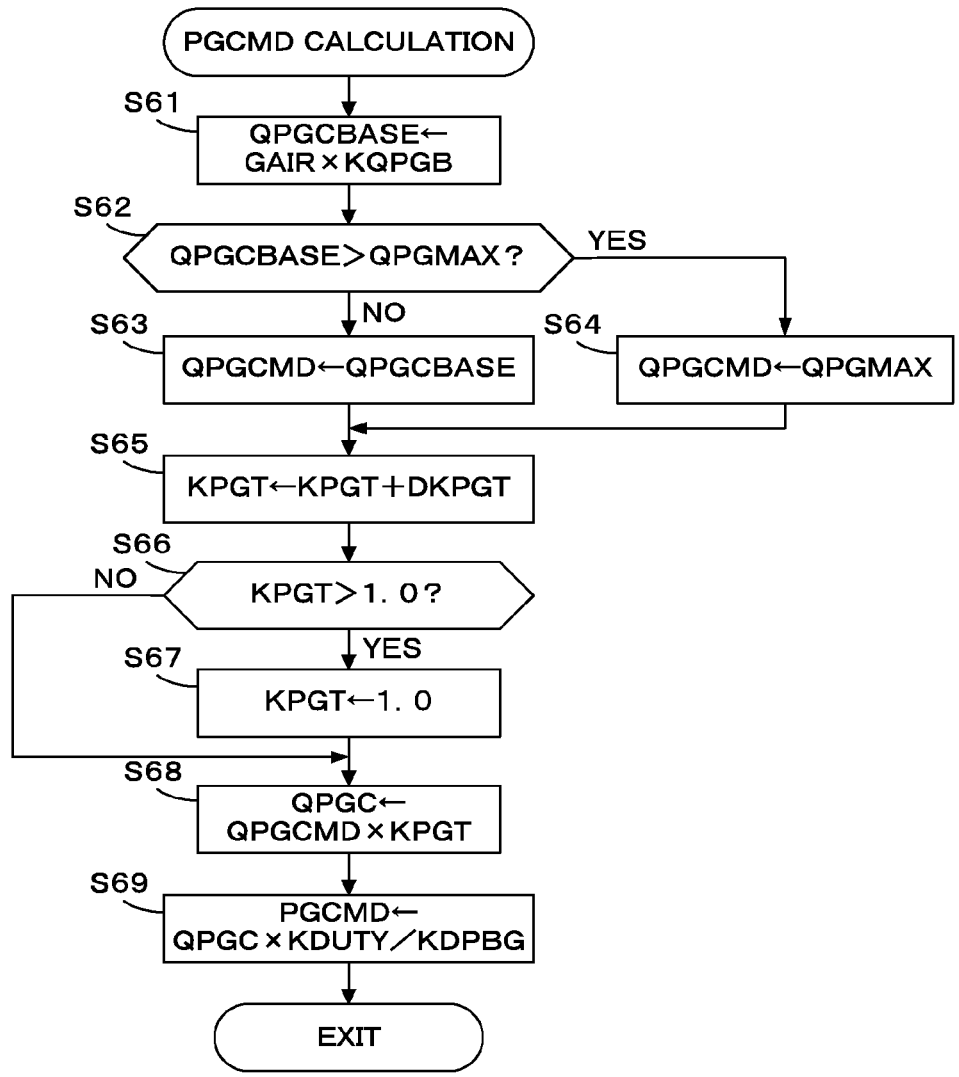
FIG. 13 is a flowchart of the PGCMD calculation process executed in the process of FIG. 12.

In step S14, a GAIRCYL calculation process shown in FIG. 11 is performed, to calculate an intake air amount GAIRCYL in one intake stroke of one cylinder according to the detected intake air flow rate GAIR [g/sec]. In step S15, the purge gas flow rate QPGC which is calculated in step S68 of FIG. 13 is applied to the following equations (19) to perform the conversion to the purge gas amount GPGC in one intake stroke of one cylinder. KC in the equations (18) is a conversion coefficient.

$$GPGC=QPGC \times KC/NE \quad (18)$$

In step S16, the intake air amount GAIRCYL and the purge gas amount GPGC are applied to the following equation (20) to calculate the intake gas amount GINGASCYL.

$$GINGASCYL=GAIRCYL+GPGC \quad (20)$$

In step S17, the total EGR ratio REGRT is calculated by the above-described equation (15).

FIG. 11 is a flowchart of the GAIRCYL calculation process executed in step S14 of FIG. 10.

In step S101, the detected intake air flow rate GAIR is applied to the following equation (21) to calculate a detected intake air amount GACYLTMP.

$$GACYLTMP=GAIR \times KC/NE \quad (21)$$

In step S102, the detected intake pressure PBA and atmospheric pressure PA are applied to the following equation (22) to calculate a modified intake pressure PBAM. In the equation (22), PAREF is a reference atmospheric pressure, which is set, for example, to 101.3 kPa.

$$PBAM=PBA \times PAREF/PA \quad (22)$$

In step S103, an REGRIREF map is retrieved according to the engine rotational speed NE and the modified intake pressure PBAM to calculate a reference internal exhaust gas recirculation ratio (hereinafter referred to as "reference internal EGR ratio") REGRIREF. In this embodiment, a plurality of REGRIREF maps are previously set corresponding to a plurality of values of the intake valve operating phase CAIN, and map selection and interpolating calculation are performed according to the intake valve operating phase CAIN (present value). The reference internal EGR ratio corresponds to an averaged internal EGR ratio in a state where no external exhaust gas recirculation via the exhaust gas recirculation passage 22 is performed.

In step S104, the reference internal EGR ratio REGRIREF and the theoretical intake air amount GATH are applied to the following equation (23) to calculate a first basic reference intake air amount GACYLREF1. The first basic reference intake air amount GACYLREF1 corresponds to a reference value of the intake air amount in the state where no external exhaust gas recirculation is performed.

$$GACYLREF1=(1-REGRIREF) \times GATH \quad (23)$$

In step S105, the first basic reference intake air amount GACYLREF1 and an EGR correction coefficient KEGR are applied to the following equation (24) to calculate a second basic reference intake air amount GACYLREF2. The second basic reference intake air amount GACYLREF2 corresponds to a reference value of the intake air amount in the state where the external exhaust gas recirculation is performed.

$$GACYLREF2=GACYLREF1 \times KEGR \quad (24)$$

In the equation (24), the EGR correction coefficient KEGR is a parameter corresponding to a value (1−REGREXCMD) obtained by subtracting a target value REGREXCMD of the external exhaust gas recirculation ratio from "1", the target value REGREXCMD being set according to the engine operating condition. The EGR correction coefficient KEGR is set to "1" when no external exhaust gas recirculation is performed.

In step S106, it is determined whether or not a KAF correcting condition flag FKAFCND is "1". The KAF correcting condition flag FKAFCND is set to "1" when all of the following conditions 1) to 4) are satisfied:

1) the engine 1 is in a predetermined high load operating condition (e.g., an operating condition where the charging efficiency is equal to or greater than 60%);

2) the external exhaust gas recirculation ratio target value REGREXCMD is equal to or greater than a predetermined value REGREXTH (e.g., 0.15);

3) it is determined that disconnection of the exhaust gas recirculation passage 22 (hereinafter referred to as "secondary air inflowing abnormality") has occurred; and 4) the knocking retard correction amount DIGKCS is equal to the maximum retard amount DIGMAX.

The above condition 3) is specifically determined as follows. It is determined whether or not an air-fuel ratio determination parameter KAFDET is within a predetermined abnormal range RABNL defined by (KAFX±DKAFX), and if the air-fuel ratio determination parameter KAFDET is within the predetermined abnormal range RABNL, it is determined that the secondary air inflowing abnormality has occurred.

$$KAFDET = KAF/KREFX \quad (25)$$

KREFX is a learning value of the air-fuel ratio correction coefficient KAF, i.e., an averaged value of the air-fuel ratio correction coefficient KAF calculated when no purged gas is supplied via the evaporative fuel passage 25 to the intake passage 2, the averaged value being a moving averaged value of a predetermined number of the recently-calculated values including the latest value. It is to be noted that when the intake air amount GAIRCYL is set to an upper limit value GACLMH or a lower limit value GACLML which are set in step S109, the learning value KREFX is maintained at a value before such setting of the intake air amount GAIRCYL is performed.

KAFX is a determination reference value calculated by the following equation (26), and DKAFX is a range set value which is set, for example, to "0.1". This determination method is based on the fact that the air-fuel ratio determination parameter KAFDET becomes substantially equal to the determination reference value KAFX calculated by the following equation (26) if the secondary air inflowing abnormality has occurred and new air which is not detected by the intake air flow rate sensor 13 flows into the intake passage 2.

$$KAFX = (GACYLTMP + GEGREXE)/GACYLTMP \quad (26)$$

GEGREXE is an estimated recirculated gas amount which is an estimated value of an amount of gases flowing into the intake passage 2 through the exhaust gas recirculation passage 22. The estimated recirculated gas amount GEGREXE is calculated by subtracting the detected intake air amount GACYLTMP from an intake gas amount GGAS (the following equation (27)).

$$GEGREXE = GGAS - GACYLTMP \quad (27)$$

The intake gas amount GGAS corresponds to a gas amount obtained by subtracting the internal exhaust gas recirculation amount GEGRIN from the theoretical intake air amount GATH. The intake gas amount GGAS is calculated by retrieving a GGAS table according to the modified intake pressure PBAM, the GGAS table being previously set (corresponding to the line L11 shown in FIG. 4(b)).

Normally, the answer to step S106 is negative (NO), and the process proceeds to step S107, in which a reference intake air amount GACYLREF is set to the second basic reference intake air amount GACYLREF2.

If the answer to step S106 is affirmative (YES), i.e., the KAF correcting condition flag FKAFCND is "1", the second basic reference intake air amount GACYLREF2, the air-fuel ratio correction coefficient KAF, and the learning value KREFX are applied to the following equation (28) to calculate the reference intake air amount GACYLREF.

$$GACYLREF = GACYLREF2 \times KAF/KREFX \quad (28)$$

In step S109, the theoretical intake air amount GATH and the reference intake air amount GACYLREF are applied respectively to the following equations (29) and (30) to calculate the upper limit value GACLMH and the lower limit value GACLML.

$$GACLMH = CLH \times GATH \quad (29)$$

$$GACLML = CLL \times GACYLREF \quad (30)$$

where CLH and CLL are constants for setting an allowable range, and set respectively to a value of about "1.05" and a value of about "0.85".

In step S110, it is determined whether or not a retard limit flag FKCSMAX is "1". The retard limit flag FKCSMAX is set to "1" when the knocking retard correction amount DIGKCS of the ignition timing is equal to the maximum retard amount DIGKMAX. If the answer to step S110 is affirmative (YES), it is determined whether or not the detected intake air amount GACYLTMP is greater than the lower limit value GACLML calculated in step S109 (step S112). If the answer to step S112 is negative (NO), i.e., GACYLTMP is equal to or less than GACLML, the intake air amount GAIRCYL is set to the reference intake air amount GACYLREF (step S114), and a switching flag FEATM is set to "1" for indicating such setting of the intake air amount GAIRCYL (step S115). On the other hand, if the answer to step S112 is affirmative (YES), the switching flag FEATM is set to "0" (step S113), and the process proceeds to step S116.

If the answer to step S110 is negative (NO), i.e., the knocking retard correction amount DIGKCS does not reach the maximum retard amount DIGKMAX, it is determined whether or not the switching flag FEATM is "1" (step S111). If the answer to step S111 is affirmative (YES), the process proceeds to step S112. If the switching flag FEATM is "0", the process proceeds to step S116.

In steps S116 to S120, the limit process of the detected intake air amount GACYLTMP is performed to calculate the intake air amount GAIRCYL. That is, if the detected intake air amount GACYLTMP is greater than the upper limit value GACLMH, the intake air amount GAIRCYL is set to the upper limit value GACLMH (steps S116 and S117), if the detected intake air amount GACYLTMP is less than the lower limit value GACLML, the intake air amount GAIRCYL is set to the lower limit value GACLML (steps S118 and S120), and if the detected intake air amount GACYLTMP is within the range between the upper limit value and the lower limit value, the intake air amount GAIRCYL is set to the detected intake air amount GACYLTMP (step S119).

It is to be noted that a transient control, which is not shown in the drawing, is performed immediately after the switching flag FEATM changes from "1" to "0". In the transient control, the intake air amount GAIRCYL is gradually changed from the reference intake air amount GACYLREF to the detected intake air amount GACYLTMP.

Figure 12:
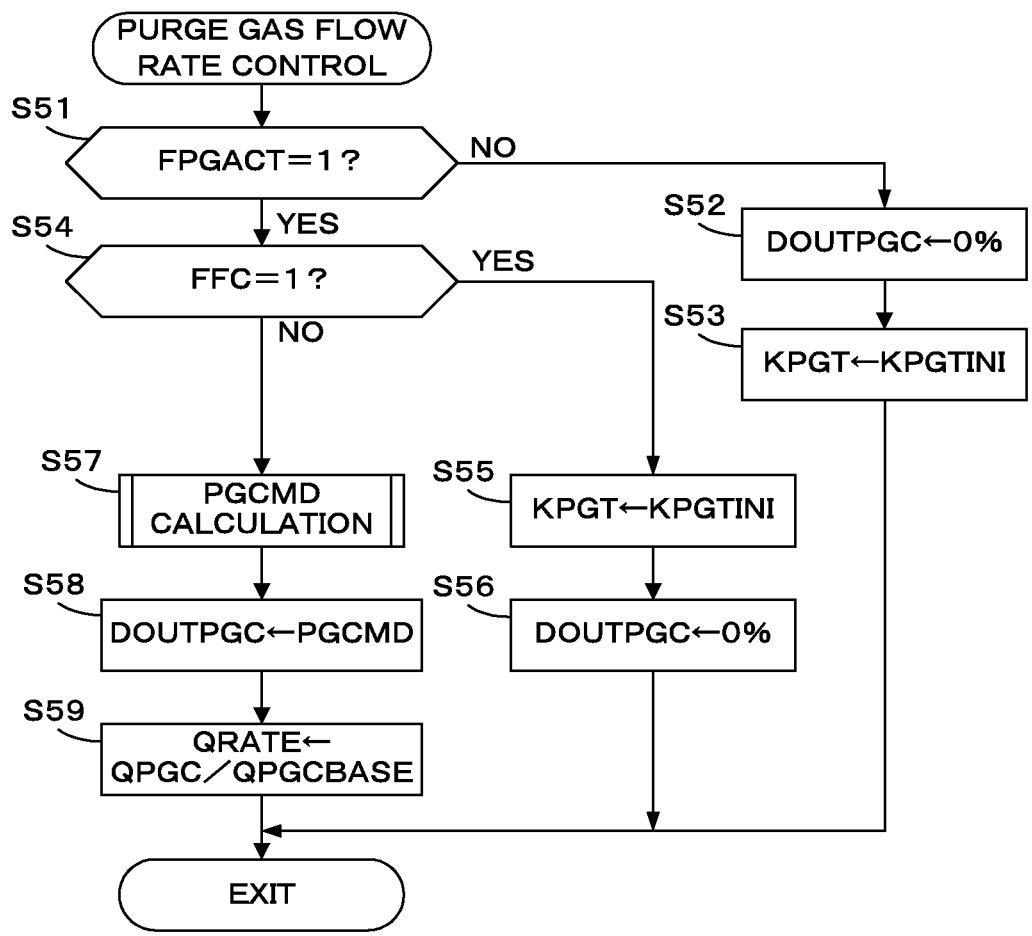
FIG. 12 is a flowchart of a process for calculating a flow rate of the evaporative fuel/air mixture.

FIG. 12 is a flowchart of a process for performing a purge gas flow rate control, i.e., an opening control of the purge control valve 26. This process is executed at predetermined time intervals (for example, 80 msec) by the CPU in the ECU 5.

In step S51, it is determined whether or not a purge execution flag FPGACT is "1". The purge execution flag FPGACT is set to "1" when the engine 1 is in the operating condition in which the purge gas is supplied to the intake passage 2. If the answer to step S51 is negative (NO), a purge control valve actuating duty DOUTPGC is set to "0" (step S52), and a transient control coefficient KPGT is set to a predetermined initial value KPGTINI (<1.0) (step S53). The transient control coefficient KPGT is a coefficient for limiting the purge gas flow rate at the beginning of supplying the purge gas. The transient control coefficient KPGT is set so as to increase with time lapse to "1.0" (refer to steps S65-S67 of FIG. 13).

If the answer to step S51 is affirmative (YES), i.e., the purge gas supply is performed, it is determined whether or not a fuel cut flag FFC is "1" (step S54). The fuel cut flag FFC is set to "1" in the operating condition in which the fuel supply to the engine 1 is temporarily stopped. If the fuel cut flag FFC is "1", the transient control coefficient KPGT is set to the predetermined initial value KPGTINI, and the purge control valve actuating duty DOUTPGC is set to "0" (steps S55 and S56).

If the answer to step S54 is negative (NO), the PGCMD calculation process shown in FIG. 13 is executed to calculate a target actuating duty PGCMD (step S57). In step S58, the purge control valve actuating duty DOUTPGC is set to the target actuating duty PGCMD. In step S59, the purge gas flow rate QPGC and the basic purge gas flow rate QPGCBASE which are calculated in the process of FIG. 13, are applied to the following equation (31) to calculate a purge gas flow rate ratio QRATE.

$$QRATE=QPGC/QPGCBASE \quad (31)$$

FIG. 13 is a flowchart of the PGCMD calculation process executed in step S57 of FIG. 12.

In step S61, the detected intake air flow rate GAIR is applied to the following equation (32) to calculate a basic purge gas flow rate QPGCBASE. In the equation (32). KQPGB is a predetermined target purge ratio.

$$QPGCBASE=GAIR \times KQPGB \quad (32)$$

In step S62, it is determined whether or not the basic purge gas flow rate QPGCBASE is greater than an upper limit value QPGMAX. If the answer to step S62 is negative (NO), the target purge gas flow rate QPGCMD is set to the basic purge gas flow rate QPGCBASE (step S63). If the basic purge gas flow rate QPGCBASE is greater than the upper limit value QPGMAX, the target purge gas flow rate QPGCMD is set to the upper limit value QPGMAX (step S64).

In step S65, the transient control coefficient KPGT is increased by a predetermined amount DKPGT (<1.0). In step S66, it is determined whether or not the transient control coefficient KPGT is greater than "1.0". If the answer to step S66 is negative (NO), the process immediately proceeds to step S68. If the answer to step S66 is affirmative (YES), the transient control coefficient KPGT is set to "1.0" (step S67), and the process proceeds to step S68.

In step S68, the target purge gas flow rate QPGCMD and the transient control coefficient KPGT are applied to the following equation (33) to calculate the purge gas flow rate QPGC.

$$QPGC=QPGCMD \times KPGT \quad (33)$$

In step S69, the purge gas flow rate QPGC is applied to the following equation (34) to convert the purge gas flow rate QPGC to the target actuating duty PGCMD. KDUTY is a predetermined conversion factor, and KDPBG is a pressure difference coefficient which is set according to a pressure difference between the intake pressure PBA and the atmospheric pressure PA.

$$PGCMD=QPGC \times KDUTY/KDPBG \quad (34)$$

As apparent from the process of FIG. 13, the purge gas flow rate ratio QRATE calculated by step S59 of FIG. 12 takes a value less than "1.0" when the transient control coefficient KPGT is less than "1.0", or when the basic purge gas flow rate QPGCBASE is greater than the upper limit value QPGMAX. Otherwise, the purge gas flow rate ratio QRATE takes a value of "1.0".

Figure 14:
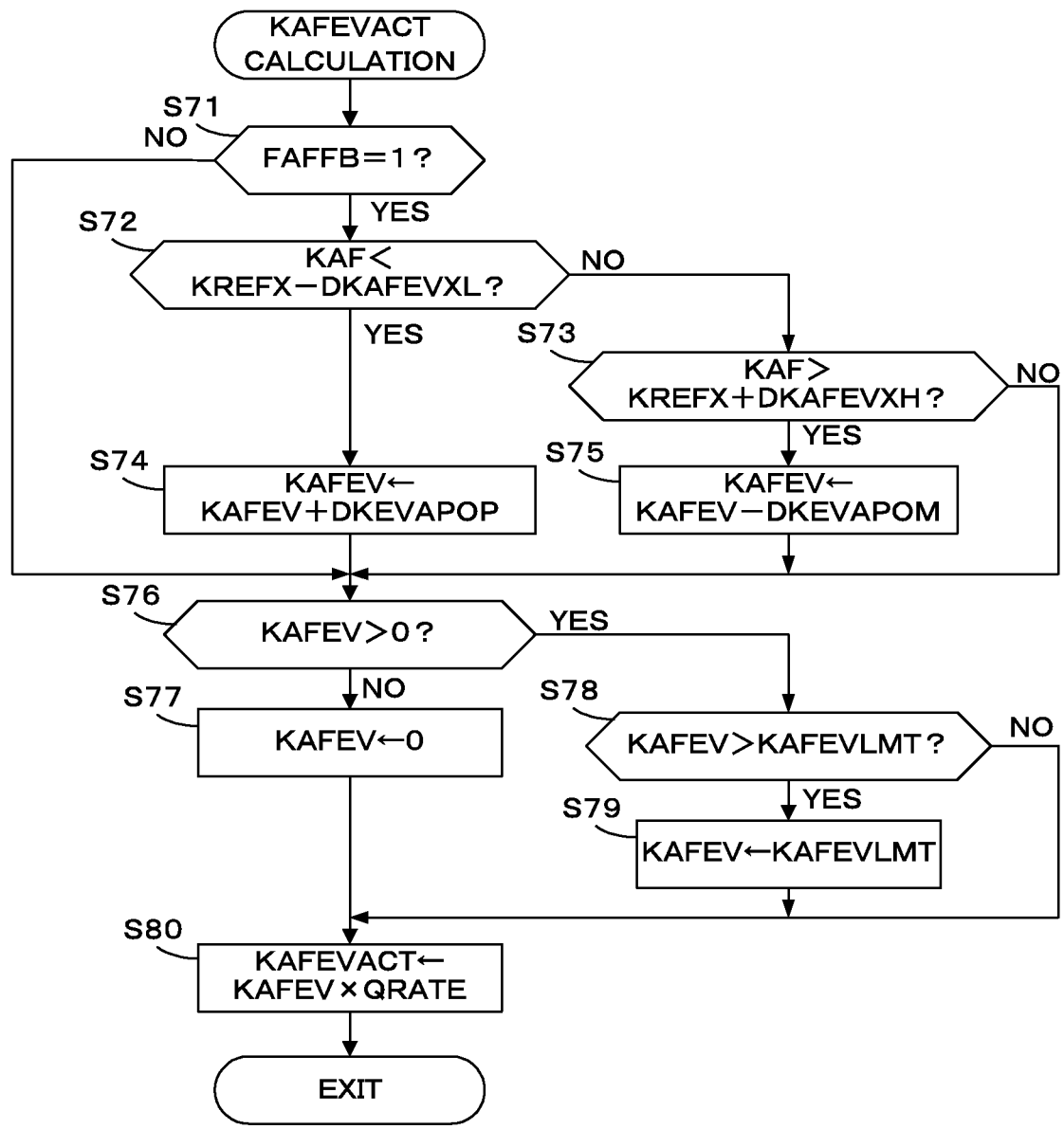
FIG. 14 is a flowchart of a process for calculating an evaporative fuel concentration coefficient (KAFEVACT).

FIG. 14 is a flowchart of a process for calculating an evaporative fuel concentration coefficient KAFEVACT indicative of the evaporative fuel concentration in the purge gas. This process is executed at predetermined time intervals (for example, 80 msec) by the CPU in the ECU 5.

In step S71, it is determined whether or not a feedback control flag FAFFB is "1". The feedback control flag FAFFB is set to "1" when performing the air-fuel ratio feedback control which makes the air-fuel ratio (KACT) detected by the LAF sensor 24 coincide with the target air-fuel ratio (KCMD). If the answer to step S71 is negative (NO), the process immediately proceeds to step S76.

If the answer to step S71 is affirmative (YES), i.e., the air-fuel ratio feedback control is performed, it is determined whether or not the air-fuel ratio correction coefficient KAF is less than a value obtained by subtracting a lower-side deviation DKAFEVXL from a learning value KREFX (step S72). The learning value KREFX is a moving average of the air-fuel ratio correction coefficient KAF calculated when the purge gas is not supplied to the intake passage 2. The lower-side deviation DKAFEVXL is a parameter for determining a deviation in the decreasing direction of the air-fuel ratio correction coefficient KAF which is caused by the purge gas supply to the intake passage 2. The lower-side deviation DKAFEVXL is set to a less value as the intake air flow rate GAIR increases.

The answer to step S72 is affirmative (YES), i.e., the deviation in the decreasing direction of the air-fuel ratio correction coefficient KAF due to the purge gas supply is comparatively large, the evaporative fuel concentration in the purge gas is determined to be comparatively high, to increase a basic concentration coefficient KAFEV by a predetermined addition amount DKEVAPOP with the following equation (35) (step S74).

$$KAFEV=KAFEV+DKEVAPOP \quad (35)$$

If the answer to step S72 is negative (NO), it is determined whether or not the air-fuel ratio correction coefficient KAF is greater than a value obtained by adding an upper-side deviation DKAFEVXH to the learning value KREFX (step S73). The upper-side deviation DKAFEVXH is a parameter for determining a deviation in the increasing direction of the air-fuel ratio correction coefficient KAF which is caused by the purge gas supply to the intake passage 2. The upper-side deviation DKAFEVXH is set to a less value as the intake air flow rate GAIR increases.

If the answer to step S73 is affirmative (YES), i.e., the deviation in the increasing direction of the air-fuel ratio correction coefficient KAF due to the purge gas supply is comparatively large, the evaporative fuel concentration in the purge gas is determined to be comparatively low, to reduce the basic concentration coefficient KAFEV by a predetermined subtraction amount DKEVAPOM with the following equation (36) (step S75).

$$KAFEV=KAFEV-DKEVAPOM \quad (36)$$

If the answer to step S73 is negative (NO), the process proceeds to step S76 without updating the basic concentration coefficient KAFEV.

In step S76, it is determined whether or not the basic concentration coefficient KAFEV is greater than "0". If the answer to step S76 is negative (NO), the basic concentration coefficient KAFEV is set to "0" (step S77). If the basic concentration coefficient KAFEV is greater than "0", it is further determined whether or not the basic concentration coefficient KAFEV is greater than the upper limit coefficient value KAFEVLMT (step S78). If the answer to step S78 is affirmative (YES), the basic concentration coefficient KAFEV is set to the upper limit coefficient value KAFEVLMT (step S79), and the process proceeds to step S80. If the answer to step S78 is negative (NO), the process immediately proceeds to step S80.

In step S80, the basic concentration coefficient KAFEV and the purge gas flow rate ratio QRATE are applied to the following equation (37), to calculate the evaporative fuel concentration coefficient KAFEVACT. The evaporative fuel concentration coefficient KAFEVACT is used in step S91 of FIG. 16.

$$KAFEVACT=KAFEV \times QRATE \quad (37)$$

Figure 15:
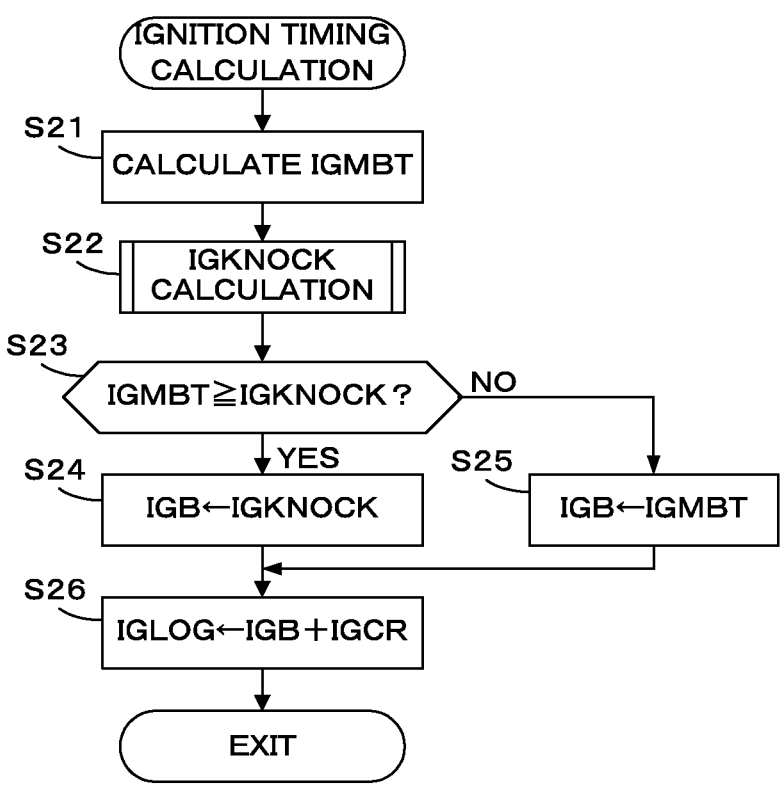
FIG. 15 is a flowchart of a process for calculating an ignition timing (IGLOG).

FIG. 15 is a flowchart of a process for calculating the ignition timing IGLOG indicated with an advancing angular amount from the compression top dead center. This process is executed by the CPU in the ECU 5 in synchronism with generation of the TDC pulse.

Figure 16:
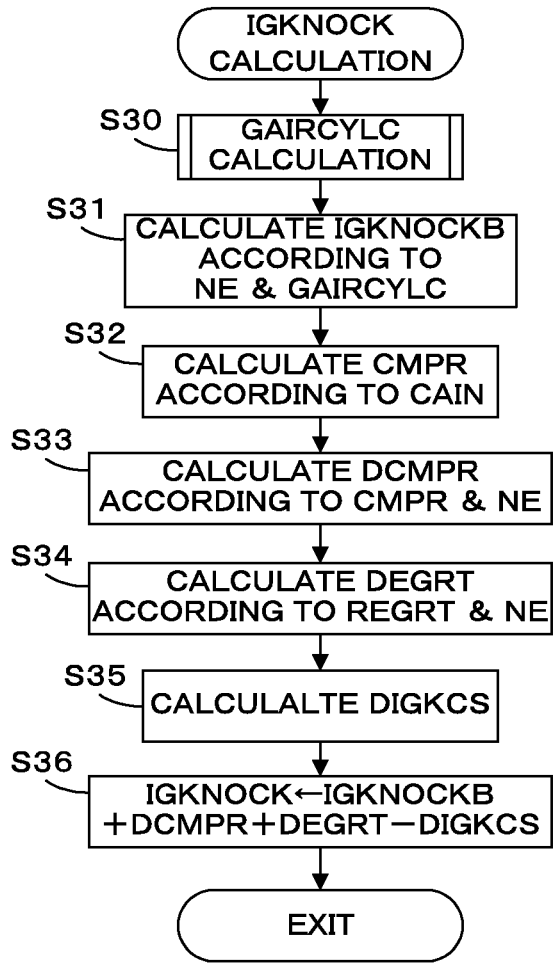
FIG. 16 is a flowchart of the IGKNOCK calculation process executed in the process of FIG. 15.

In step S21, an IGMBT map (refer to FIG. 7) is retrieved according to the engine rotational speed NE and the total EGR ratio REGRT to calculate the optimum ignition timing IGMBT. In step S22, the IGKNOCK calculation process shown in FIG. 16 is executed to calculate the knock limit ignition timing IGKNOCK.

In step S23, it is determined whether or not the optimum ignition timing IGMBT is equal to or greater than the knock limit ignition timing IGKNOCK. If the answer to step S23 is affirmative (YES), a basic ignition timing IGB is set to the knock limit ignition timing IGKNOCK (step S24). If the optimum ignition timing IGMBT is less than the knock limit ignition timing IGKNOCK in step S23, the basic ignition timing IGB is set to the optimum ignition timing IGMBT (step S25).

In step S26, the ignition timing IGLOG is calculated by adding the basic ignition timing IGB and a correction value IGCR which is for example calculated according to the engine coolant temperature TW.

The CPU in the ECU 5 performs the ignition with the spark plug 15 according to the calculated ignition timing IGLOG.

FIG. 16 is a flowchart of the IGKNOCK calculation process executed in step S22 of FIG. 15.

Figure 17:
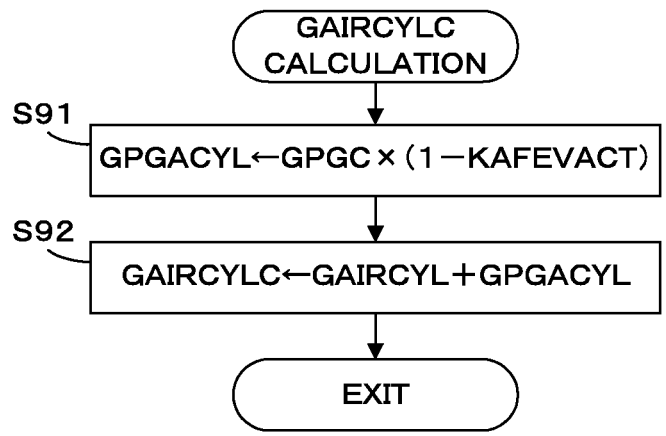
FIG. 17 is a flowchart of the GAIRCYLC calculation process executed in the process of FIG. 16.

In step S30, the GAIRCYLC calculation process shown in FIG. 17 is executed to calculate the corrected intake air amount GAIRCYLC. In step S91 of FIG. 17, the purge gas amount GPGC and the evaporative fuel concentration coefficient KAFEVACT are applied to the following equation (41) to calculate the secondary fresh air amount GPGACYL indicative of an amount of fresh air contained in the purge gas.

$$GPGACYL=GPGC \times (1-KAFEVACT) \quad (41)$$

In step S92, the corrected intake air amount GAIRCYLC is calculated by adding the secondary fresh air amount GPGACYL to the intake air amount GAIRCYL (with the following equation (42)).

$$GAIRCYLC=GAIRCYL \pm GPGACYL \quad (42)$$

Returning to FIG. 16, in step S31, an IGKNOCKB map is retrieved according to the engine rotational speed NE and the corrected intake air amount GAIRCYLC, to calculate a basic knock limit ignition timing IGKNOCKB. The IGKNOCKB map is set corresponding to the state where the total EGR ratio REGRT is set to a predetermined reference value and the intake valve operating phase CAIN is set to "0 degree".

Figure 18:
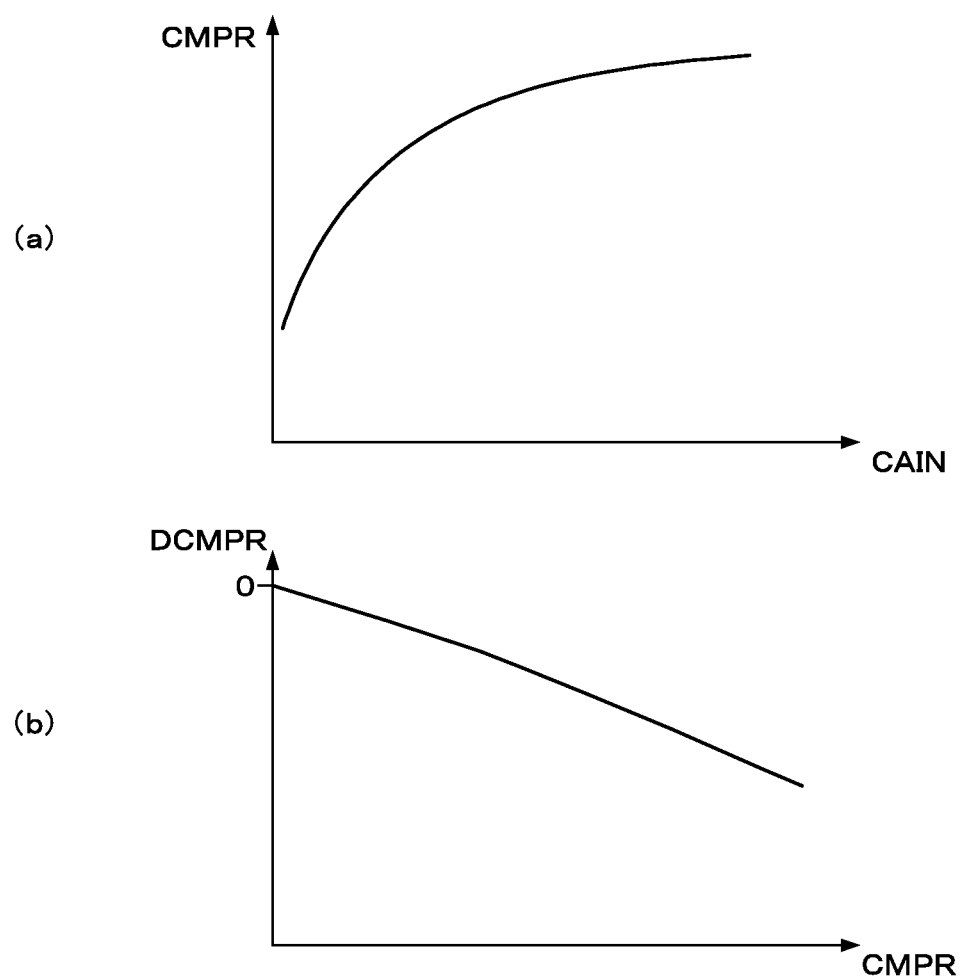
FIGS. 18(a) and 18(b) show graphs for illustrating the table and the map which are referred to in the process of FIG. 16.

In step S32, a CMPR table shown in FIG. 18($a$) is retrieved according to the intake valve operating phase CAIN to calculate the effective compression ratio CMPR. The intake valve closing timing CACL changes depending on the intake valve operating phase CAIN, which accordingly changes the effective compression ratio CMPR. The relationship between the intake valve operating phase CAIN and the effective compression ratio CMPR is previously calculated and set as the CMPR table.

In step S33, a DCMPR map is retrieved according to the effective compression ratio CMPR and the engine rotational speed NE to calculate a compression ratio knock correction amount DCMPR. The compression ratio knock correction amount DCMPR takes a value which is equal to or less than "0", and is set so as to decrease as the effective compression ratio CMPR increases, as shown in FIG. 18($b$). A method for calculating the effective compression ratio CMPR is shown in International Publication No. WO2011/074302.

In step S34, a DEGRT map is retrieved according to the total EGR ratio REGRT and the engine rotational speed NE to calculate the EGR knock correction amount DEGRT. The EGR knock correction amount DEGRT takes a value which is greater than "0", and is set so as to increase as the total EGR ratio REGRT increases, as shown in FIG. 9.

In step S35, a knocking retard correction amount DIGKCS is calculated based on a detection result of a knocking detection process (not shown) based on the output from the knock sensor 14. The knocking retard correction amount DIGKCS is calculated by multiplying a retard coefficinet KCS with a maximum retard amount DIGMAX, the retard coefficient KCS being calculated so as to increase when a knocking is detected and gradually decrease during a period in which no knocking is detected. The calculation method of the knocking retard correction amount DIGKCS according to the knocking occurrence condition is already known, e.g., by Japanese Patent Publication No. 4087265.

In step S36, the basic knock limit ignition timing IGKNOCKB, the compression ratio knock correction amount DCMPR, the EGR knock correction amount DEGRT, and the knocking retard correction amount DIGKCS are applied to the following equation (43) to calculate the knock limit ignition timing IGKNOCK.

$$IGKNOCK=IGKNOCKB+DCMPR+DEGRT-DIGKCS \quad (43)$$

It is to be noted that in this embodiment, the valve opening time period of the fuel injection valve 6, i.e., the fuel injection amount TOUT, is also calculated using the total EGR ratio REGRT.

Figure 19:
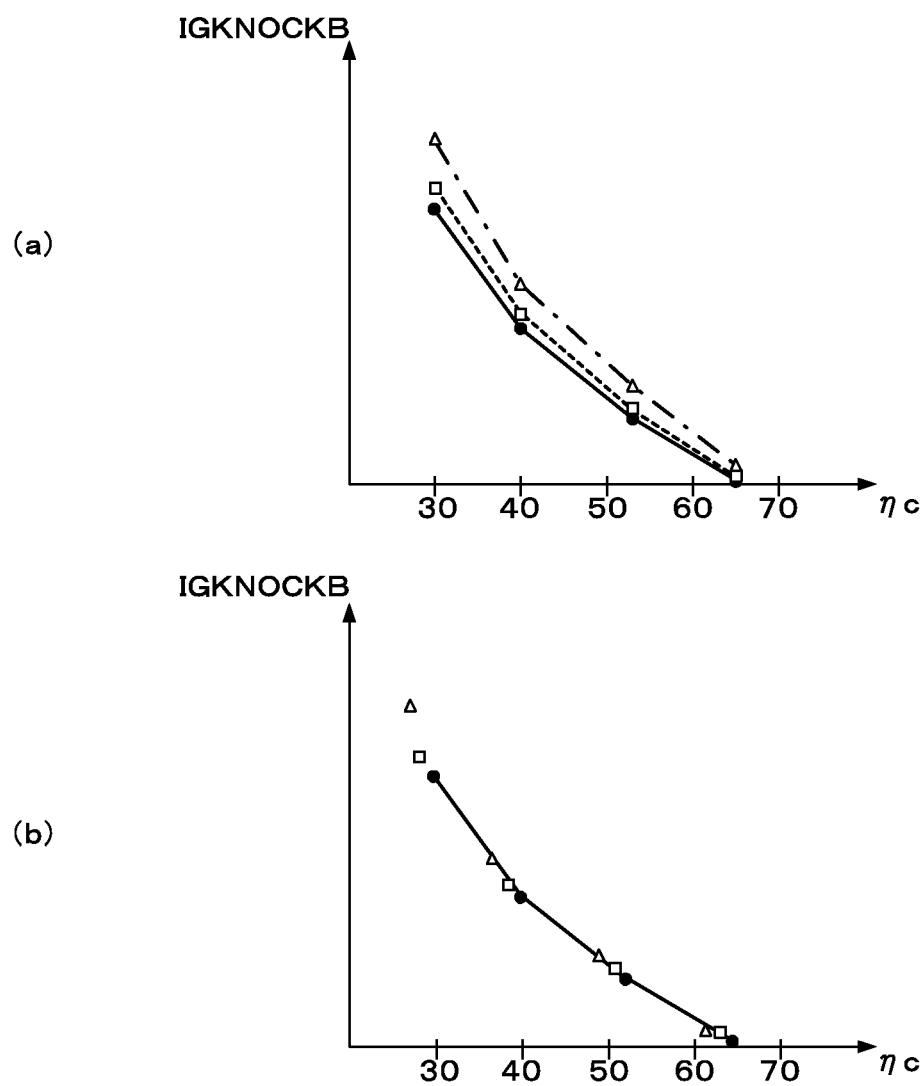
FIGS. 19(a) and 19(b) show graphs of a relationship between the charging efficiency (ηc) and the basic knock limit ignition timing (IGKNOCKB).

FIGS. 19(a) and 19(b) show relationships between the charging efficiency ηc and the basic knock limit ignition timing IGKNOCKB. Specifically, the solid line shown in FIG. 19(a) indicates an example in which the basic knock limit ignition timing IGKNOCKB is calculated according to the intake air amount GAIRCYL even when supplying the purge gas to the intake passage 2. On the other hand, the soling line shown in FIG. 19(b) indicates an example in which the basic knock limit ignition timing IGKNOCKB is calculated according to the corrected intake air amount GAIRCYLC.

The symbols □ and Δ shown in FIGS. 19(a) and 19(b) indicate actual knock limit ignition timings, and correspond respectively to the state where the ratio of the purge gas in the intake gas amount is 25% and the state where the ratio of the purge gas in the intake gas amount is 75%. That is, if the basic knock limit ignition timing IGKNOCKB is calculated according to the intake air amount GAIRCYL, the basic knock limit ignition timing IGKNOCKB is set to a value on the retarded side with respect to the actual knock limit ignition timing, which makes the setting error of the basic knock limit ignition timing IGKNOCKB greater.

On the other hand, when the basic knock limit ignition timing IGKNOCKB is calculated according to the corrected intake air amount GAIRCYLC, the difference between the basic knock limit ignition timing IGKNOCKB and the actual knock limit ignition timing almost becomes "0", which can improve setting accuracy of the basic knock limit ignition timing IGKNOCKB.

Figure 20:
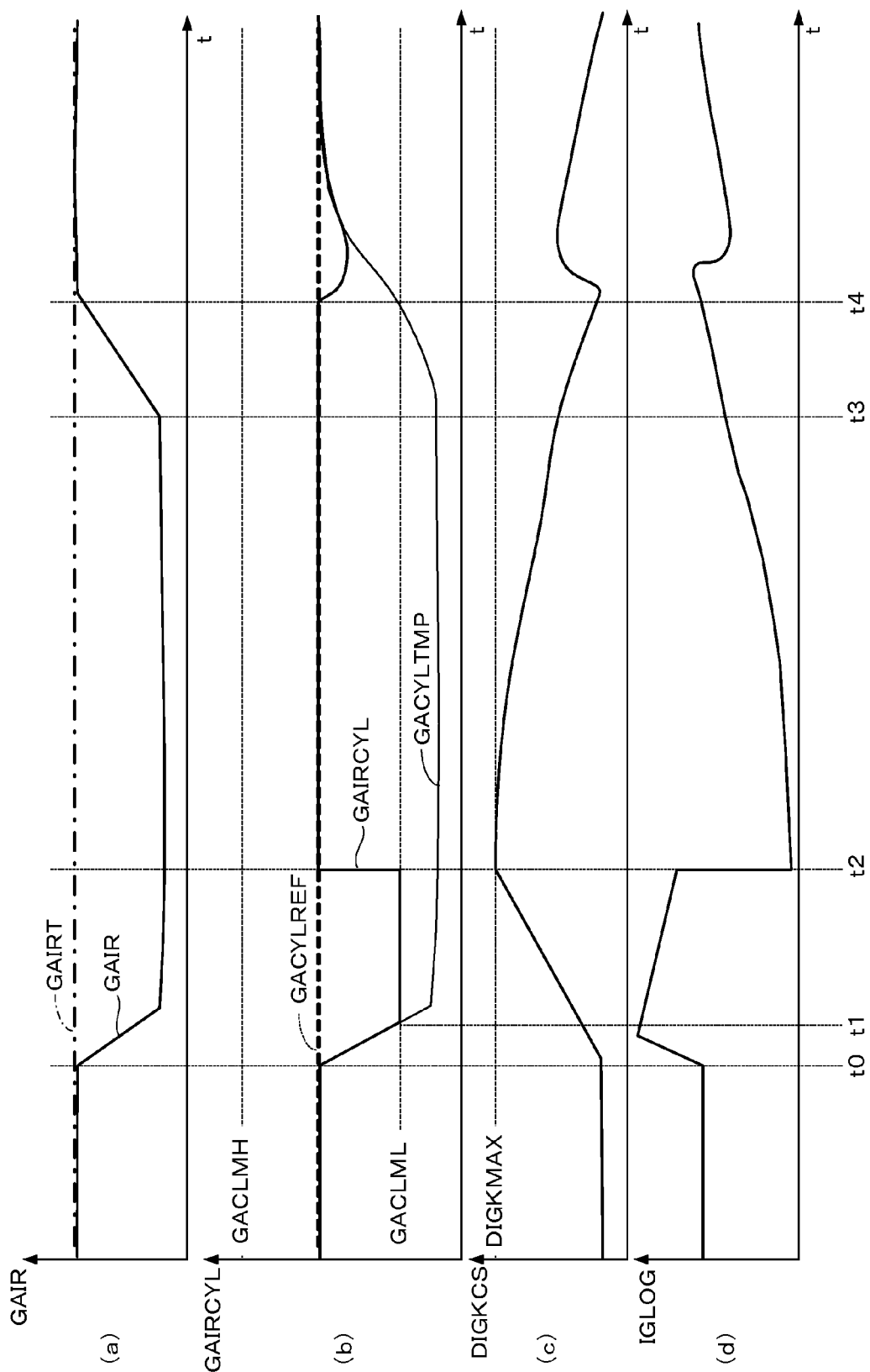
FIGS. 20(a)-20(d) show time charts for illustrating a control operation example.

FIGS. 20(a)-20(d) show timecharts of a first control operation example, in which changes in the detected intake air flow rate GAIR (FIG. 20(a)), the calculated intake air amount GAIRCYL (FIG. 20(b)), the knocking retard correction amount DIGKCS of the ignition timing (FIG. 20(c)), and the ignition timing IGLOG (FIG. 20(d)) are shown. This example corresponds to the state where the intake air flow rate sensor 13 fails, or fresh air inflowing occurs due to abnormality (passage disconnection) of the evaporative fuel passage 25. The dashed line of FIG. 20(a) shows a true intake air flow rate GAIRT.

When the detected intake air flow rate GAIR begins deviating from the true value GAIRT at time t0, the intake air amount GAIRCYL is set to the detected intake air amount GACYLTMP until time t1. Accordingly, the intake air amount GAIRCYL decreases similarly to the detected intake air amount GACYLTMP, and is set to the lower limit value GACLML after time t1. The ignition timing IGLOG therefore increases in response to the decrease in the detected intake air amount GACYLTMP until a time point slightly before time t1. On the other hand, since the knocking retard correction amount DIGKCS gradually increases after time t0, the ignition timing IGLOG decreases from a time point slightly before time t1. Thereafter, the knocking retard correction amount DIGKCS reaches the maximum retard amount DIGKMAX (retard limit value) at time t2. Consequently, the answer to step S110 of FIG. 11 becomes affirmative (YES), and the answer to step S112 becomes negative (NO) (GACYLTMP GACLML). Accordingly, the intake air amount GAIRCYL is set to the reference intake air amount GACYLREF, which makes the ignition timing IGLOG abruptly change to a value corresponding to the reference intake air amount GACYLREF, and the knocking retard correction amount DIGKCS gradually decreases after time t2.

The detected intake air flow rate GAIR begins increasing from time t3, and the detected intake air amount GACYLTMP exceeds the lower limit value GACLML. As a result, the answer to step S112 of FIG. 11 becomes affirmative (YES). Accordingly, the intake air amount GAIRCYL gradually changes to the detected intake air amount GACYLTMP. The knocking retard correction amount DIGKCS gradually decreases from a time point slightly after t2 to time t4, and changes with changes in the intake air amount GAIRCYL after a time point slightly after time t4.

In the example shown in FIGS. 20(a)-20(d), the second basic reference intake air amount GACYLREF2 calculated according to the modified intake pressure PBAM substantially coincides with the true intake air amount. Accordingly, the answer to step S106 of FIG. 11 becomes negative (NO), and the reference intake air amount GACYLREF is set to the second basic reference intake air amount GACYLREF2. During the period from time t2 to time t4, the intake air amount GAIRCYL is set to the reference intake air amount GACYLREF, which prevents occurrence of knocking (hence the knocking retard correction amount DIGKCS gradually decreases).

Figure 21:
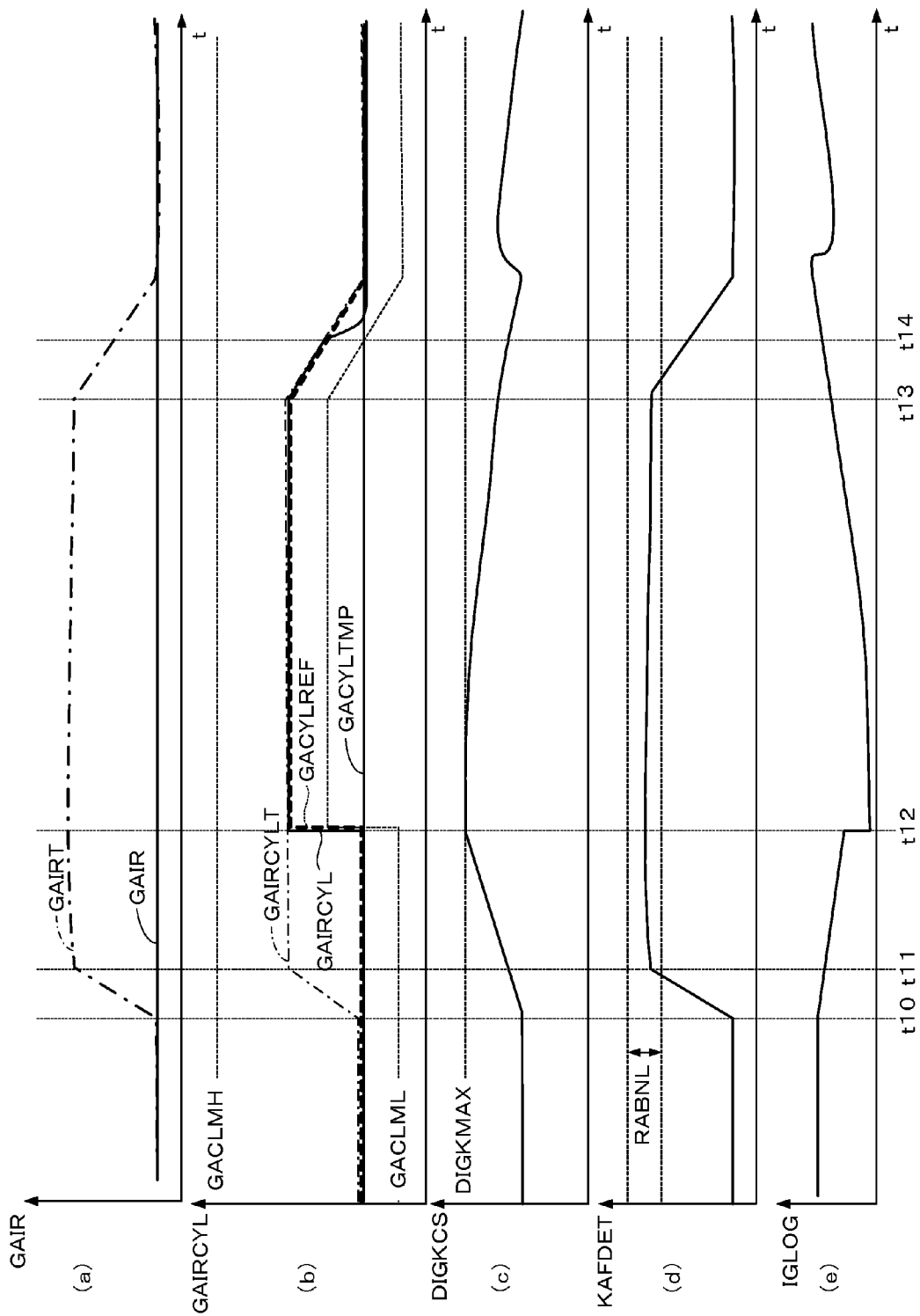
FIGS. 21(a)-21(e) show time charts for illustrating a control operation example.

FIGS. 21(a)-21(e) show timecharts of a second control operation example, in which changes in the detected intake air flow rate GAIR (FIG. 21(a)), the calculated intake air amount GAIRCYL (FIG. 21(b)), the knocking retard correction amount DIGKCS of the ignition timing (FIG. 21(c)), the air-fuel ratio determination parameter KAFDET (FIG. 21(d)), and the ignition timing IGLOG (FIG. 21(e)) are shown. This example corresponds to the state where fresh air inflowing occurs due to abnormality (passage disconnection) of the exhaust gas recirculation passage 22. The dashed line of FIGS. 21(a) and 21(b) respectively show the true intake air flow rate GAIRT and the corresponding true intake air amount GAIRCYLT.

In this example, the modified intake pressure PBAM takes a value which is substantially equal to a value corresponding to the state where the exhaust gas recirculation passage 22 is normal and the exhaust gas recirculation is normally performed. Accordingly, the second basic reference intake air amount GACYLREF2 greatly deviates from the true intake air amount GAIRCYLT. Consequently, the reference intake air amount GACYLREF (=GACYLREF2) does not change even when the detected intake air amount GACYLTMP begins deviating from the true value GAIRCYLT.

On the other hand, since the true intake air amount GAIRCYLT increases, the air-fuel ratio correction coefficient KAF increases, and the air-fuel ratio determination parameter KAFDET increases. The air-fuel ratio determination parameter KAFDET reaches a value within the predetermined abnormal range RABLN (KAFX±DKAFX) at a time slightly before time t11. The knocking retard correction amount DIGKCS gradually increases after time t10 and reaches the maximum retard amount DIGKMAX at time t12, since the intake air amount GAIRCYL deviates from the true intake air amount GAIRCYLT.

As a result, both of the answers to steps S106 and S110 of FIG. 11 become affirmative (YES), and the reference intake air amount GACYLREF is set to a value obtained by multiplying the second basic reference intake air amount GACYLREF2 with the air-fuel ratio determination parameter KAFDET (=KAF/KREFX) (step S108). With this setting, the lower limit value GACLML increases, the answer to step S112 becomes negative (NO), and the intake air amount GAIRCYL is set to the reference intake air amount GACYLREF calculated in step S108 (step S114). Consequently, the intake air amount GAIRCYL and the reference intake air amount GACYLREF substantially coincide with the true intake air amount GAIRCYLT.

Since the true intake air flow rate GAIRT decreases from time t13, the air-fuel ratio determination parameter KAFDET, the reference intake air amount GACYLREF, and the lower limit value GACLML decrease, the detected intake air amount GACYLTMP exceeds the lower limit value GACLML at time t14, and the answer to step S112 of FIG. 11 becomes affirmative (YES). Accordingly, the intake air amount GAIRCYL gradually changes to the detected intake air amount GACYLTMP. The knocking retard correction amount DIGKCS gradually decreases from a time point slightly after time t12 to time t14, and changes with changes in the intake air amount GAIRCYL from a time point slightly after time t14.

In this example, if the knocking retard correction amount DIGKCS reaches the maximum retard amount DIGKMAX, the reference intake air amount GACYLREF is set to a value obtained by multiplying the second basic reference intake air amount GACYLCREF2 with the air-fuel ratio determination parameter KAFDET (=KAF/KREFX). During the period from time t12 to time t14, the intake air amount GAIRCYL is set to the reference intake air amount GACYLREF, which prevents occurrence of knocking (hence the knocking retard correction amount DIGKCS gradually decreases). As described above, upon disconnection of the exhaust gas recirculation passage 22, the second basic reference intake air amount GACYLREF2 calculated according to the modified intake pressure PBAM cannot approximate the true intake air amount GAIRCYLT. Accordingly, correcting the second basic reference intake air amount GACYLREF2 with the air-fuel ratio correction coefficient KAF and the learning value KREFX, makes it possible to appropriately perform the control using the intake air amount GAIRCYL, which is set to a value in the vicinity of the true intake air amount GAIRCYLT.

As described above, in this embodiment, the theoretical wide-open air amount GAWOT, which is an intake air amount corresponding to the state where the throttle valve is fully opened, is calculated according to the intake valve operating phase CAIN and the engine rotational speed NE, and the theoretical intake air amount GATH, which is an intake air amount corresponding to the state where an amount of recirculated exhaust gases is equal to "0", is calculated according to the theoretical wide-open intake air amount GAWOT and the intake pressure PBA. Further, an amount GPGC of the evaporative fuel/air mixture supplied through the evaporative fuel passage 25 to the intake passage 2 is calculated, the intake gas amount GINGASCYL is calculated by correcting the intake air amount GAIRCYL using the evaporative fuel/air mixture amount GPGC, and the total EGR ratio REGRT is calculated using the theoretical intake air amount GATH and the intake gas amount GINGASCYL. The ignition timing control is performed using the total EGR ratio REGRT. Further, an air-fuel ratio correction coefficient KAF is calculated according to the detected equivalent ratio KACT, the learning value KREFX of the air-fuel ratio correction coefficient KAF is calculated, the reference intake air amount GACYLREF is calculated using the modified intake pressure PBAM, the engine rotational speed NE, the air-fuel ratio correction coefficient KAF, and the learning value KREFX. The lower limit value GACLML of the intake air amount is calculated according to the reference intake air amount GACYLREF, the upper limit value GACLMH is calculated according to the theoretical intake air amount GATH, and the limit process for limiting the detected intake air amount GACYLTMP within the range of the upper limit value GACLMH and the lower limit value GACLML, is performed.

Accordingly, an accurate value of the total EGR ratio REGRT is obtained taking the evaporative fuel/air mixture into account with comparatively simple calculation, which makes it possible to enhance accuracy of the ignition timing control. Further, the lower limit value GACLML is set using the air-fuel ratio correction coefficient KAF and the learning value KREFX in addition to the modified intake pressure PBAM and the engine rotational speed NE, the air-fuel ratio correction coefficient KAF reflecting an actual air-fuel ratio of the air/fuel mixture burning in the engine. Accordingly, the limit process for limiting the detected intake air amount GACYLTMP within a range of values which are equal to or greater than the lower limit value GACLML, is appropriately performed, for example, upon failure of the intake air flow rate sensor 13, or disconnection of the evaporative fuel passage 25 or the exhaust gas recirculation passage 22, which makes it possible to avoid serious deterioration in accuracy of the ignition timing control. In addition, the total EGR ratio REGRT is calculated using the intake gas amount GINGACYL corrected using the evaporative fuel/air mixture amount GPGC supplied through the evaporative fuel passage 25 to the intake passage 2. Consequently, an accurate value of the total EGR ratio REGRT can be obtained even when the evaporative fuel is being supplied.

Further, the knocking retard correction amount DIGKCS is calculated so that the knocking retard correction amount DIGKCS increases as a detection frequency of the knocking becomes higher, and the ignition timing control is performed using the knocking retard correction amount DIGKCS. The fail-safe process is performed so that the intake air amount GAIRCYL is replaced with the reference intake air amount GACYLREF, when the knocking retard correction amount DIGKCS reaches the maximum retard amount DIGKMAX. Accordingly, knocking is surely prevented from occurring in the condition where the detected intake air amount GACYLTMP greatly deviates from the actual intake air amount GAIRCYLT.

Further, the estimated recirculated gas amount GEGREXE which is an estimated value of an amount of gases flowing through the exhaust gas recirculation passage 22 into the intake passage 2, is calculated, and it is determined that the exhaust gas recirculation passage 22 is abnormal, when the air-fuel ratio determination parameter KAFDET is within the predetermined range RABNL (KAFX±DKAFX) set according to the detected intake air amount GACYLTMP and the estimated recirculated gas amount GEGREXE. Further, the fail-safe process for replacing the intake air amount GAIRCYL with the reference intake air amount GACYLREF, which is modified using the air-fuel ratio determination parameter KAFDET, is performed, when the following conditions are satisfied: the external exhaust gas recirculation ratio target value REGREXCMD through the exhaust gas recirculation passage 22 is equal to or greater than the predetermined value REGREXTH; the engine 1 is in the predetermined high load operating condition; the exhaust gas recirculation passage 22 is determined to be abnormal; and the knocking retard correction amount DIGKCS reaches the maximum retard amount DIGKMAX.

Upon occurrence of disconnection of the exhaust gas recirculation passage 22, the second reference intake air amount GACYLREF2 calculated according to the modified intake pressure PBAM greatly deviates from the actual intake air amount. Accordingly, using the reference intake air amount GACYLREF modified by multiplying the air-fuel ratio determination parameter KAFDET, makes it possible to approximate the actual intake air amount with high accuracy. Consequently, by replacing the intake air amount GAIRCYL with the modified reference intake air amount GACTKREF, knocking can be surely prevented from occurring when the disconnection of the exhaust gas recirculation passage 22 occurs, and new air flows into the intake passage 2 from the exhaust gas recirculation passage 22. Further, by using the air-fuel ratio determination parameter KAFDET obtained by dividing the air-fuel ratio correction coefficient KAF by the learning value KREFX, influence of differences in characteristics of fuel injection valves 6 or the intake air flow rate sensor 13 can be removed, which makes it possible to perform the modification with high accuracy.

Further, the optimum ignition timing IGMBT is calculated according to the total EGR ratio REGRT, which makes it possible to obtain an accurate value of the optimum ignition timing IGMBT taking the internal exhaust gas recirculation into account. Further, it is confirmed that the relationship between the total EGR ratio REGRT and the optimum ignition timing IGMBT is not affected by the intake valve operating phase CAIN, or whether the external exhaust gas recirculation is performed or not (refer to FIG. 7). Accordingly, by setting the optimum ignition timing IGMBT according the total EGR ratio REGRT, the optimum ignition timing IGMBT suitable for the engine operating condition can easily be calculated. Consequently, by performing the ignition timing control using the calculated optimum ignition timing IGMBT, the output performance of the engine can sufficiently be realized.

Further, the evaporative fuel concentration coefficient KAFECACT indicative of the evaporative fuel concentration in the purge gas is calculated, and the secondary fresh air amount GPGACYL is calculated according to the evaporative fuel/air mixture amount GPGC and the evaporative fuel concentration coefficient KAFECACT. Further, the corrected intake air amount GAIRCYLC is calculated by correcting the intake air amount GAIRCYL with the secondary fresh air amount GPGACYL, and the basic knock limit ignition timing IGKNOCKB is calculated according to the engine rotational speed NE and the corrected intake air amount GAIRCYLC. Further, the EGR knock correction amount DEGRT is calculated according to the total EGR ratio REGRT, and the knock limit ignition timing IGKNOCK is calculated by correcting the basic knock limit ignition timing IGKNOCKB with the EGR knock correction amount DEGRT.

The knock limit ignition timing IGKNOCK is highly correlated with the total EGR ratio REGRT (refer to FIG. 9). Accordingly, performing the correction with the EGR knock correction amount DEGRT calculated according to the total EGR ratio REGRT, makes it possible to perform the ignition timing control with high accuracy. The engine output is therefore maximized within the range for surely avoiding the knocking. In addition, the amount of fresh air sucked into the cylinder is equal to a sum of the intake air amount GAIRCYL and the secondary fresh air amount GPGACYL. Accordingly, by calculating the knock limit ignition timing IGKNOCK according to the corrected intake air amount GAIRCYLC in addition to the total EGR ratio REGRT, calculation accuracy of the knock limit ignition timing IGKNOCK can be improved.

Further, the compression ratio knock correction amount DCMPR is calculated according to the intake valve operating phase CAIN, and the basic knock limit ignition timing IGKNOCKB is corrected according to the compression ratio knock correction amount DCMPR. Accordingly, an accurate value of the knock limit ignition timing IGKNOCK can be obtained when the intake valve operating phase CAIN is changed according to the engine operating condition.

Specifically, the effective compression ratio CMPR of the engine is calculated according to the intake valve operating phase CAIN, and the compression ratio knock correction amount DCMPR is calculated according to the effective compression ratio CMPR. The knock limit ignition timing IGKNOCK changes depending on the effective compression ratio CMPR. Accordingly, the correction can more appropriately be performed by calculating the effective compression ratio CMPR of the engine according to the intake valve operating phase CAIN, and correcting the basic knock limit ignition timing IGKNOCKB according to the effective compression ratio CMPR.

In this embodiment, the crank angle position sensor 11 and the intake pressure sensor 8 correspond respectively to the rotational speed detecting means and the intake pressure detecting means, the intake air flow rate sensor 13 corresponds to the intake air amount detecting means, and the LAF sensor 24 corresponds to the air-fuel ratio detecting means. The knock sensor 14 constitutes the knocking detecting means. Further, the ECU 5 constitutes the wide-open intake air amount calculating means, the theoretical intake air amount calculating means, the evaporative fuel/air mixture amount calculating means, the intake gas amount calculating means, the air-fuel ratio correctiong amount calculating means, the learning value calculating means, the reference intake air amount calculating means, the lower limit value setting means, the limit process means, the exhaust gas recirculation ratio calculating means, the evaporative fuel concentration calculating means, the corrected intake air amount calculating means, the optimum ignition timing calculating means, the knock limit ignition timing calculating means, the estimated recirculated gas amount calculating means, the abnormality determining means, a part of the knocking detecting means, the retard correction amount calculating means, and the fail-safe process means. Specifically, steps S11 and S12 of FIG. 10 correspond to the wide-open intake air amount calculating means, step S13 corresponds to the theoretical intake air amount calculating means, step S16 corresponds to the intake gas amount calculating means, step S17 corresponds to the exhaust gas recirculation ratio calculating means, steps S102-S108 correspond to the reference intake air amount calculating means, step S109 corresponds to the lower limit setting means, steps 118-120 correspond to the limit process means, steps 110-S115 correspond to the fail-safe process means, steps S61-S68 of FIG. 13 correspond to the evaporative fuel/air mixture amount calculating means, the process of FIG. 14 corresponds to the evaporative fuel concentration calculating means, step S21 of FIG. 15 corresponds to the optimum ignition timing calculating means, the process of FIG. 16 corresponds to the knock limit ignition timing calculating means, the process of FIG. 17 corresponds to the corrected intake air amount calculating means.

Figure 22:
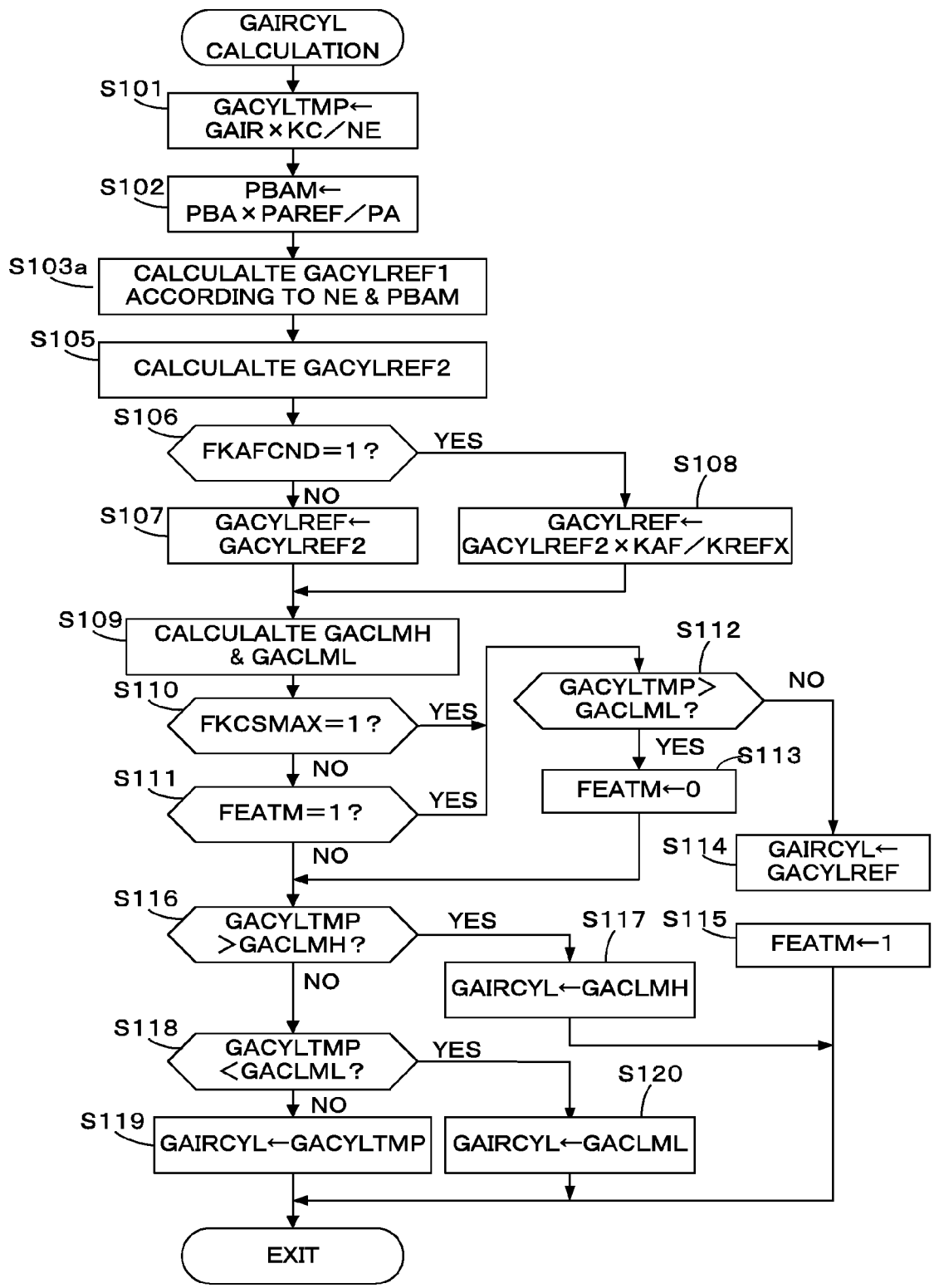
FIG. 22 is a flowchart of a modification of the process of FIG. 11.

The present invention is not limited to the embodiment described above, and various modifications may be made. For example, in the above-described embodiment, the process of FIG. 11 may be modified as shown in FIG. 22. The process of FIG. 22 is obtained by deleting step S104 of FIG. 11 and replacing step S103 with step S103a. In step S103a, a GACYLREF1 map is retrieved according to the engine rotational speed NE and the modified intake pressure PBAM (as well as the intake valve operation phase CAIN), to calculate the first basic reference intake air amount GACYLREF1. The GACYLREF1 map corresponds to a map in which values of the first basic reference intake air amount GACYLREF1 calculated in steps S103 and S104 of FIG. 11 are set.

Further, in the above-described embodiment, an example in which the present invention is applied to controlling the internal combustion engine wherein the external exhaust gas recirculation through the exhaust gas recirculation passage 22 is performed. The present invention is applicable also to controlling the internal combustion engine wherein no external exhaust gas recirculation is performed (only the internal exhaust gas recirculation is performed).

Further, in the above-described embodiment, the effective compression ratio CMPR is calculated according to the intake valve operating phase CAIN, and the compression ratio knock correction amount DCMPR is calculated according to the effective compression ratio CMPR. Alternatively, the compression ratio knock correction amount DCMPR may directly be calculated according to the intake valve operating phase CAIN. Further, the present invention is applicable to control of an internal combustion engine in which the intake valve operating phase is fixed.

Further, the present invention can also be applied to controlling a watercraft propulsion engine such as an outboard engine having a vertically extending crankshaft.

DESCRIPTION OF REFERENCE NUMERALS

1 Internal combustion engine
2 Intake passage
3 Throttle valve
5 Electronic control unit (wide-open intake air amount calculating means, theoretical intake air amount calculating means, evaporative fuel/air mixture amount calculating means, intake gas amount calculating means, air-fuel ratio correction amount calculating means, learning value calculating means, reference intake air amount calculating means, lower-limit value setting means, limit process means, exhaust gas recirculation ratio calculating means, evaporative fuel concentration calculating means, corrected intake air amount calculating means, optimum ignition timing calculating means, knock limit ignition timing calculating means, estimated recirculated gas amount calculating means, abnormality determining means, a part of knocking detecting means, retard correction amount calculating means, fail-safe process means)
8 Intake pressure sensor (intake pressure detecting means)
11 Crank angle position sensor (rotational speed detecting means)
13 Intake air flow rate sensor (intake air amount obtaining means)
14 Knock sensor (knocking detecting means)
21 Exhaust passage
22 Exhaust gas recirculation passage
24 Oxygen concentration sensor (air-fuel ratio detecting means)
25 Evaporative fuel passage

The invention claimed is:

1. A control apparatus for an internal combustion engine having a throttle valve disposed in an intake passage of said engine, and an evaporative fuel passage for supplying an evaporative fuel/air mixture to said intake passage, the evaporative fuel/air mixture being a mixture of air and evaporative fuel generated in a fuel tank for supplying fuel to said engine, said control apparatus being characterized by comprising:
rotational speed detecting means for detecting a rotational speed of said engine;
intake pressure detecting means for detecting an intake pressure of said engine;
wide-open intake air amount calculating means for calculating a wide-open intake air amount according to the engine rotational speed, the wide-open intake air amount being an intake air amount corresponding to a state where said throttle valve is fully opened;
theoretical intake air amount calculating means for calculating a theoretical intake air amount according to the wide-open intake air amount and the intake pressure, the theoretical intake air amount being an intake air amount corresponding to a state where no exhaust gas of said engine is recirculated to a combustion chamber of said engine;
intake air amount detecting means for detecting an intake air amount of said engine;
air-fuel ratio detecting means for detecting an air-fuel ratio in an exhaust passage of said engine;
air-fuel ratio correction amount calculating means for calculating an air-fuel ratio correction amount according to the detected air-fuel ratio;
learning value calculating means for calculating a learning value of the air-fuel ratio correction amount;
reference intake air amount calculating means for calculating a reference intake air amount using the intake pressure, the engine rotational speed, the air-fuel ratio correction amount, and the learning value;
lower limit value setting means for setting a lower limit value of the detected intake air amount according to the reference intake air amount;
limit process means for performing a limit process for limiting the detected intake air amount within a range of values which are equal to or greater than the lower limit value;
evaporative fuel/air mixture amount calculating means for calculating an amount of the evaporative fuel/air mixture supplied through said evaporative fuel passage to said intake passage;
intake gas amount calculating means for calculating an intake gas amount by correcting the limit-processed intake air amount using the evaporative fuel/air mixture amount; and
exhaust gas recirculation ratio calculating means for calculating an exhaust gas recirculation ratio using the theoretical intake air amount and the intake gas amount,
wherein said engine is controlled using the exhaust gas recirculation ratio.

2. The control apparatus according to claim 1, further comprising optimum ignition timing calculating means for calculating an optimum ignition timing at which an output of said engine becomes maximum, according to the exhaust gas recirculation ratio,
wherein an ignition timing of said engine is controlled using the optimum ignition timing.

3. The control apparatus according to claim 2, further comprising:
knocking detecting means for detecting knocking of said engine;
retard correction amount calculating means for calculating a retard correction amount of the ignition timing so that the retard correction amount increases as a detection frequency of the knocking by said knocking detecting means becomes higher; and
fail-safe process means for replacing the limit-processed intake air amount with the reference intake air amount, when the retard correction amount reaches a retard limit value;
wherein the ignition timing control of said engine is performed using the retard correction amount.

4. The control apparatus according to claim 3, wherein said engine having an exhaust gas recirculation passage for recirculating exhaust gases from said exhaust passage to said intake passage,
wherein said control apparatus further includes:
estimated recirculated gas amount calculating means for calculating an estimated recirculated gas amount which is an estimated value of an amount of gases flowing through said exhaust gas recirculation passage into said intake passage; and abnormality determining means for determining that said exhaust gas recirculation passage is abnormal, when an air-fuel ratio determination parameter is within a predetermined range set according to the detected intake air amount and the estimated recirculated gas amount, the air-fuel ratio determination parameter being obtained by dividing the air-fuel ratio correction amount by the learning value;

wherein said reference intake air amount calculating means modifies the reference intake air amount by multiplying the air-fuel ratio determination parameter with the reference intake air amount when the following conditions are satisfied:

a target value of an external exhaust gas recirculation ratio through said exhaust gas recirculation passage is equal to or greater than a predetermined value;

said engine is in a predetermined high load operating condition;

said exhaust gas recirculation passage is determined to be abnormal by said abnormality determining means; and the retard correction amount reaches the retard limit value, wherein said fail-safe process means replaces the limit-processed intake air amount with the modified reference intake air amount.

5. The control apparatus according to claim 2, further comprising:

evaporative fuel concentration calculating means for calculating an evaporative fuel concentration in the evaporative fuel/air mixture;

corrected intake air amount calculating means for calculating a corrected intake air amount by correcting the intake air amount with a fresh air amount in the evaporative fuel/air mixture, the fresh air amount being calculated according to the evaporative fuel/air mixture amount and the evaporative fuel concentration; and knock limit ignition timing calculating means for calculating a knock limit ignition timing according to the exhaust gas recirculation ratio and the corrected intake air amount, the knock limit ignition timing corresponding to an occurrence limit of knocking in said engine, wherein the ignition timing control is performed using any one of the optimum ignition timing and the knock limit ignition timing that is set to a more retarded value.

6. A control method for an internal combustion engine having a throttle valve disposed in an intake passage of said engine, and an evaporative fuel passage for supplying an evaporative fuel/air mixture to said intake passage, the evaporative fuel/air mixture being a mixture of air and evaporative fuel generated in a fuel tank for supplying fuel to said engine, said control method being characterized by comprising the steps of:

a) detecting an rotational speed of said engine;

b) detecting an intake pressure of said engine;

c) calculating a wide-open intake air amount according to the engine rotational speed, the wide-open intake air amount being an intake air amount corresponding to a state where said throttle valve is fully opened;

d) calculating a theoretical intake air amount according to the wide-open intake air amount and the intake pressure, the theoretical intake air amount being an intake air amount corresponding to a state where no exhaust gas of said engine is recirculated to a combustion chamber of said engine;

e) detecting an intake air amount of said engine;

f) detecting an air-fuel ratio in an exhaust passage of said engine;

g) calculating an air-fuel ratio correction amount according to the detected air-fuel ratio;

h) calculating a learning value of the air-fuel ratio correction amount;

i) calculating a reference intake air amount using the intake pressure, the engine rotational speed, the air-fuel ratio correction amount, and the learning value;

j) setting a lower limit value of the detected intake air amount according to the reference intake air amount;

k) performing a limit process for limiting the detected intake air amount within a range of values which are equal to or greater than the lower limit value;

l) calculating an amount of the evaporative fuel/air mixture supplied through said evaporative fuel passage to said intake passage;

m) calculating an intake gas amount by correcting the limit-processed intake air amount using the evaporative fuel/air mixture amount; and n) calculating an exhaust gas recirculation ratio using the theoretical intake air amount and the intake gas amount, wherein said engine is controlled using the exhaust gas recirculation ratio.

7. The control method according to claim 6, further comprising the step of o) calculating an optimum ignition timing at which an output of said engine becomes maximum, according to the exhaust gas recirculation ratio, wherein an ignition timing of said engine is controlled using the optimum ignition timing.

8. The control method according to claim 7, further comprising the steps of:

p) detecting knocking of said engine;

q) calculating a retard correction amount of the ignition timing so that the retard correction amount increases as a detection frequency of the knocking becomes higher; and r) replacing the limit-processed intake air amount with the reference intake air amount, when the retard correction amount reaches a retard limit value;

wherein the ignition timing control of said engine is performed using the retard correction amount.

9. The control apparatus according to claim 8, wherein said engine having an exhaust gas recirculation passage for recirculating exhaust gases from said exhaust passage to said intake passage, wherein said control method further includes the steps of:

s) calculating an estimated recirculated gas amount which is an estimated value of an amount of gases flowing through said exhaust gas recirculation passage into said intake passage; and t) determining that said exhaust gas recirculation passage is abnormal, when an air-fuel ratio determination parameter is within a predetermined range set according to the detected intake air amount and the estimated recirculated gas amount, the air-fuel ratio determination parameter being obtained by dividing the air-fuel ratio correction amount by the learning value;

wherein the reference intake air amount is modified by multiplying the air-fuel ratio determination parameter with the reference intake air amount in said step i) when the following conditions are satisfied:

a target value of an external exhaust gas recirculation ratio through said exhaust gas recirculation passage is equal to or greater than a predetermined value;

said engine is in a predetermined high load operating condition;

said exhaust gas recirculation passage is determined to be abnormal in said step t); and the retard correction amount reaches the retard limit value, wherein the limit-processed intake air amount is replaced with the modified reference intake air amount in said step r).

10. The control method according to claim 7, further comprising the steps of:

u) calculating an evaporative fuel concentration in the evaporative fuel/air mixture;

v) calculating a corrected intake air amount by correcting the intake air amount with a fresh air amount in the evaporative fuel/air mixture, the fresh air amount being calculated according to the evaporative fuel/air mixture amount and the evaporative fuel concentration; and w) calculating a knock limit ignition timing according to the exhaust gas recirculation ratio and the corrected intake air amount, the knock limit ignition timing corresponding to an occurrence limit of knocking in said engine, wherein the ignition timing control is performed using any one of the optimum ignition timing and the knock limit ignition timing that is set to a more retarded value.

* * * * *